US009043363B2

(12) United States Patent
Dragojevic et al.

(10) Patent No.: US 9,043,363 B2
(45) Date of Patent: May 26, 2015

(54) SYSTEM AND METHOD FOR PERFORMING MEMORY MANAGEMENT USING HARDWARE TRANSACTIONS

(75) Inventors: Aleksandar Dragojevic, Lausanne (CH); Maurice Herlihy, Brookline, MA (US); Yosef Lev, New York, NY (US); Mark S. Moir, Wellington (NZ)

(73) Assignee: Oracle International Corporation, Redwood City, CA (US)

( * ) Notice: Subject to any disclaimer, the term of this patent is extended or adjusted under 35 U.S.C. 154(b) by 397 days.

(21) Appl. No.: 13/167,606

(22) Filed: Jun. 23, 2011

(65) Prior Publication Data

US 2012/0310987 A1    Dec. 6, 2012

Related U.S. Application Data

(60) Provisional application No. 61/493,286, filed on Jun. 3, 2011.

(51) Int. Cl.
*G06F 17/30*    (2006.01)
*G06F 9/46*    (2006.01)

(52) U.S. Cl.
CPC ..................... *G06F 9/467* (2013.01)

(58) Field of Classification Search
CPC ... G06F 17/30; G06F 17/30348; G06F 9/466; G06F 9/467; G06F 9/524; G06F 9/48; G06F 9/52; G06F 9/54; G06F 11/3632; G06F 11/3624; G06F 11/366; G06F 17/30356; Y10S 707/955; Y10S 707/99953; Y10S 707/99957

USPC ......... 707/704, 703, 778, 791, 799, 800, 801, 707/829, 999.008, 792, 813, 818, E17.005; 711/150, 151, 152, 153, 147, 10, 711/E12.001, 162, E12.01, 156, 163, 711/E12.066; 718/100, 101, 106; 710/206
See application file for complete search history.

(56) References Cited

U.S. PATENT DOCUMENTS 5,283,869 A *   2/1994   Adams et al. .................. 709/237
5,428,761 A     6/1995   Herlihy et al.
6,691,194 B1 *  2/2004   Ofer ............................... 710/200

(Continued)

OTHER PUBLICATIONS

Ravi Rajwar, Maurice Herlihy and Konrad Lai—"Virtualizing Transactional Memory" —Proceedings of the 32nd International Symposium on Computer Architecture (ISCA'05) Jun. 4-8, 2005 IEEE (pp. 494-505).*

(Continued)

*Primary Examiner* — Anh Ly
(74) *Attorney, Agent, or Firm* — Robert C. Kowert; Meyertons, Hood, Kivlin, Kowert & Goetzel, P.C.

(57) ABSTRACT

The systems and methods described herein may be used to implement a shared dynamic-sized data structure using hardware transactional memory to simplify and/or improve memory management of the data structure. An application (or thread thereof) may indicate (or register) the intended use of an element of the data structure and may initialize the value of the data structure element. Thereafter, another thread or application may use hardware transactions to access the data structure element while confirming that the data structure element is still part of the dynamic data structure and/or that memory allocated to the data structure element has not been freed. Various indicators may be used determine whether memory allocated to the element can be freed.

19 Claims, 11 Drawing Sheets

(56) References Cited

U.S. PATENT DOCUMENTS

| | | | |
|---|---|---|---|
| 6,993,770 B1* | 1/2006 | Detlefs et al. | 719/315 |
| 7,194,495 B2* | 3/2007 | Moir et al. | 707/610 |
| 7,254,597 B2* | 8/2007 | Moir et al. | 707/999.202 |
| 7,299,242 B2* | 11/2007 | Moir et al. | 718/100 |
| 7,328,316 B2* | 2/2008 | Moir et al. | 711/150 |
| 7,395,274 B2* | 7/2008 | Moir et al. | 707/999.103 |
| 7,395,382 B1* | 7/2008 | Moir | 711/147 |
| 7,516,365 B2* | 4/2009 | Lev | 714/38.13 |
| 7,516,366 B2* | 4/2009 | Lev et al. | 714/38.13 |
| 7,536,517 B2* | 5/2009 | Harris | 711/150 |
| 7,703,098 B1* | 4/2010 | Moir et al. | 718/101 |
| 7,818,513 B2* | 10/2010 | Moir | 711/150 |
| 7,849,446 B2 | 12/2010 | Lev et al. | |
| 7,856,537 B2* | 12/2010 | Kumar et al. | 711/152 |
| 7,890,953 B2* | 2/2011 | Li et al. | 718/100 |
| 7,895,401 B2* | 2/2011 | Moir et al. | 711/147 |
| 8,046,403 B2* | 10/2011 | Mazzaferri | 709/202 |
| 8,286,183 B2* | 10/2012 | Baird et al. | 718/107 |
| 2001/0056420 A1* | 12/2001 | Steele et al. | 707/8 |
| 2003/0182462 A1* | 9/2003 | Moir et al. | 709/310 |
| 2003/0182465 A1* | 9/2003 | Moir et al. | 709/314 |
| 2004/0015642 A1* | 1/2004 | Moir et al. | 711/1 |
| 2004/0088415 A1* | 5/2004 | Chandrasekar et al. | 709/226 |
| 2004/0194096 A1* | 9/2004 | Armstrong et al. | 718/100 |
| 2006/0085591 A1* | 4/2006 | Kumar et al. | 711/113 |
| 2006/0173885 A1* | 8/2006 | Moir et al. | 707/101 |
| 2007/0186069 A1* | 8/2007 | Moir | 711/162 |
| 2007/0189979 A1* | 8/2007 | Zeng et al. | 424/46 |
| 2007/0198979 A1* | 8/2007 | Dice et al. | 718/100 |
| 2007/0239915 A1* | 10/2007 | Saha et al. | 710/200 |
| 2007/0239942 A1 | 10/2007 | Rajwar et al. | |
| 2007/0239943 A1* | 10/2007 | Dice et al. | 711/147 |
| 2007/0260608 A1* | 11/2007 | Hertzberg et al. | 707/10 |
| 2007/0282838 A1* | 12/2007 | Shavit et al. | 707/8 |
| 2007/0288708 A1* | 12/2007 | Saha et al. | 711/159 |
| 2008/0005504 A1* | 1/2008 | Barnes et al. | 711/156 |
| 2008/0114937 A1* | 5/2008 | Reid et al. | 711/117 |
| 2008/0229139 A1* | 9/2008 | Moir et al. | 714/1 |
| 2008/0281888 A1* | 11/2008 | Tene et al. | 707/206 |
| 2009/0031309 A1* | 1/2009 | Lev | 718/101 |
| 2009/0031310 A1* | 1/2009 | Lev et al. | 718/101 |
| 2009/0133032 A1* | 5/2009 | Biles et al. | 718/106 |
| 2009/0171962 A1* | 7/2009 | Goodman et al. | 707/8 |
| 2009/0172306 A1* | 7/2009 | Nussbaum et al. | 711/154 |
| 2009/0198705 A1* | 8/2009 | Hattori | 707/10 |
| 2009/0217018 A1* | 8/2009 | Abrashkevich et al. | 712/244 |
| 2010/0066457 A1* | 3/2010 | Muller | 331/111 |
| 2010/0122060 A1* | 5/2010 | Hertzberg et al. | 711/170 |
| 2011/0055837 A1* | 3/2011 | Kumar et al. | 718/101 |
| 2011/0099335 A1* | 4/2011 | Scott et al. | 711/141 |
| 2011/0125973 A1* | 5/2011 | Lev et al. | 711/153 |
| 2011/0137962 A1* | 6/2011 | McKenney et al. | 707/818 |
| 2011/0137967 A1* | 6/2011 | Jansson | 708/170 |
| 2011/0246724 A1* | 10/2011 | Marathe et al. | 711/147 |
| 2013/0125097 A1* | 5/2013 | Ebcioglu et al. | 717/136 |
| 2013/0238579 A1* | 9/2013 | Gray et al. | 707/703 |

OTHER PUBLICATIONS

Dave Dice, Ori Shalev and Nir Shavit—"Transactional Locking II" Sun Microsystems Laboratories, DISC' 2006, LNCS 4167—Springer-Verlag, 2006 (pp. 194-208).*

Herlithy et al. "Software transactional memory for dynamic-sized data structures" —PODC 2003 Sun Microsystems, INc. (pp. 1-9) ACM 2003 Jul. 13-16, 2003.*

Herlihy et al.—"Nonblocking memory management support for dynamic-sized data structures" —ACM vol. 23, No. 2, May 2005, pp. 146-196.*

Arrvindh Shriraman et al.—"An integrated hardware-software approach to flexible transactional memory" —Proceeding ISCA '07 Proceedings of the 34th annual international symposium on Computer architecture—ACM SIGARCH Computer Architecture News vol. 35 Issue 2, May 2007 pp. 104-115.*

Dave Dice, Ori Shalev, and Nir Shavit—"Transactional Locking II" —Distributed Computing—Lecture Notes in Computer Science vol. 4167, 2006, pp. 194-208.*

Maurice Herlihy, Victor Luchangco, Mark Moir and William. Scherer. Software Transactional Memory for Dynamic-sized Data Structures, Proceedings of the Twenty-Second Annual ACM SIGACT-SIGOPS Symposium on Principles of Distributed Computing (PODC), Jul. 2003, 9 pages.

Advanced Micro Devices. Advanced synchronization facility proposed architectural specification, Mar. 2009. Publication#45432,Revision: 2.1, 43 pages.

Y. Afek, H. Attiya, D. Dolev, E. Gafni, M. Merritt, and N. Shavit. Atomic snapshots of shared memory. Journal of the ACM, Sep. 1993, 21 pages.

H. Attiya, A. Fouren, and E. Gafni. An adaptive collect algorithm with applications. Distributed Computing, Apr. 2002.

H. Attiya and D. Hendler. Time and space lower bounds for implementations using k-cas. IEEE Transactions on Parallel and Distributed Systems, Feb. 2010, 12 pages.

C. Blundell, E. C. Lewis, and M. Martin. Deconstructing Transactions: The Subtleties of Atomicity. In the 4th Annual Workshop on Duplicating, Deconstructing, and Debunking, 2005, 7 pages.

D. Dice, M. Herlihy,D. Lea,Y.Lev,V. Luchangco, W. Mesard, M. Moir, K. Moore, and D. Nussbaum. Applications of the adaptive transactional memory test platform. Transact 2008 workshop, 10 pages.

D. Dice, Y. Lev, V. J. Marathe, M. Moir, D. Nussbaum, and M. Oleszewski. Simplifying concurrent algorithms by exploiting hardware transactional memory. In Proceedings of the 22nd ACM symposium on Parallelism in algorithms and architectures, SPAA '10, 2010, 10 pages.

D. Dice, Y. Lev, M. Moir, and D. Nussbaum. Early experience with a commercial hardware transactional memory implementation. In Proceeding of the 14th international conference on Architectural support for programming languages and operating systems, ASPLOS'09, 2009, 12 pages.

D. Dice, Y. Lev, M. Moir, D. Nussbaum, and M. Olszewski. Early experience with a commercial hardware transactional memory implementation. Technical Report TR-2009-180, Sun Microsystems Laboratories, 2009, 60 pages.

M. Herlihy,V. Luchangco, P. Martin, and M. Moir. Nonblocking memory management support for dynamic-sized data structures. ACM Transactions on Computer Systems, May 2005, 51 pages.

M. Herlihy, V. Luchangco, and M. Moir. Space and time adaptive non-blocking algorithms. Electronic Notes in Theoretical Computer Science, Apr. 2003.

M. Herlihy and J. E. B. Moss. Transactional memory: architectural support for lock-free data structures. In Proceedings of the 20th annual international symposium on Computer architecture, ISCA '93, 1993, 12 pages.

M. Michael. Hazard pointers: Safe memory reclamation for lock-free objects. IEEE Transactions on Parallel and Distributed Systems, Jun. 2004, 14 pages.

M. M. Michael and M. L. Scott. Simple, fast, and practical non-blocking and blocking concurrent queue algorithms. In Proceedings of the 15th annual ACM symposium on Principles of distributed computing, PODC '96, 1996, 9 pages.

* cited by examiner

SYSTEM AND METHOD FOR PERFORMING MEMORY MANAGEMENT USING HARDWARE TRANSACTIONS

This application claims priority to U.S. Provisional Application Ser. No. 61/493,286, which was filed on Jun. 3, 2011.

BACKGROUND

1. Field of the Disclosure

This disclosure relates generally to dynamic-sized shared data structures, and more particularly to systems and methods for exploiting hardware transactions in managing memory for such data structures.

2. Description of the Related Art

The multi-core revolution currently in progress is making it increasingly important for applications to exploit concurrent execution in order to take advantage of advances in technology. For example, it may be possible to increase parallelism by allowing multiple threads to execute a critical section at one time if the executions do not rely on overlapping memory locations. Shared-memory systems allow multiple threads to access and operate on the same memory locations, e.g., locations within concurrent dynamic-sized data structures.

Dynamic memory management is a significant source of complexity in the design and implementation of practical concurrent data structures. The Java™ concurrency libraries provide a number of lock-free data structures that have no counterparts in C++. A key obstacle to porting them to C++ is that Java is garbage-collected, while C++ requires explicit memory management, which can be very difficult to implement correctly for concurrent dynamic-sized data structures.

Transactional memory (TM) is a mechanism that can be leveraged to enable concurrent and correct execution of a critical section by multiple threads. Transactional memory allows a thread to execute a block of instructions either completely and atomically or not at all. For example, transactional memory allows programmers to use transactional or atomic blocks, which may be considered sequential code blocks that should be executed atomically. In other words, executions of atomic blocks by different threads do not appear to be interleaved. To execute an atomic block, the underlying system may begin a transaction, execute the atomic block's memory accesses using that transaction, and then may try to commit the transaction. If the transaction commits successfully, the atomic block's execution seems to take effect atomically at the transaction's commit point. If it fails, the execution does not seem to take effect at all and the atomic block might be retried using a new transaction. It is the responsibility of the TM implementation to guarantee the atomicity of operations executed by transactions. The transactional memory paradigm can significantly simplify the design of concurrent programs. In general, transactional memory can be implemented in hardware (HTM), in software (STM), or as a hybrid transactional memory system (HyTM).

SUMMARY

The systems and methods described herein may in some embodiments be used to implement shared data structures in a manner that exploits hardware transactional memory (HTM) to simplify and/or otherwise improve memory management in a computer system. The techniques described herein may facilitate the implementation of dynamic-sized concurrent data structures that are superior in terms of simplicity, flexibility, performance, and space usage, when compared to those that do not use HTM.

In some embodiments, an application that includes one or more accesses to a dynamic-sized concurrent (i.e. shared) data structure (or a thread thereof) may use a hardware transaction to update an indicator to reflect that an element of the data structure is available to be accessed by the application (or thread). For example, the indicator may be reference counter associated with the data structure element, an indicator field within the data structure element itself, a pointer to the data structure element (e.g., an indirect reference to the data structure element), or a pointer within the data structure element (e.g., a pointer whose value may be used to determine whether the data structure element itself is in use). In some embodiments, the hardware transaction may allocate a new data structure element for the use of the application (or thread) and/or may write a value to the data structure element.

After updating the indicator (i.e. after the hardware transaction to update the indicator commits), the application (or thread) may write one or more values to the data structure element. In some embodiments, these write operations may be performed transactionally, while in other embodiments they may be performed non-transactionally. In some embodiments, other applications or threads may also access the data structure element, e.g. to read or modify its value. The other applications or threads accessing the data structure may in some embodiments only access the data structure element after determining that it has not yet been freed (i.e. deallocated). For example, they may use a hardware transaction to confirm that the memory allocated to the data structure element has not yet been freed and, if not, to write a value to the data structure element. Note that, as used herein, the terms "deallocate", "free", "reclaim" and/or "recycle" may be used somewhat interchangeably in describing various operations in which physical or logical memory that was previously allocated to a data structure (e.g., by the operating system or by a call to a method/function thereof) is made unavailable to that data structure.

In some embodiments, when the application no longer needs the data structure element, it may use another hardware transaction to update the indicator to reflect that the data structure element will no longer be accessed by the application. In response to the indicator being updated to reflect that it will no longer be accessed by the application, the application or thread (or another application or thread) may free the memory allocated to the data structure element and/or memory allocated to the indicator for other uses.

In various embodiments, a collect type operation may be configured to traverse a collection of indicators associated with respective elements of the data structure to determine whether the associated element is in use, is expected (or intended) to be in use, and/or is still part of the data structure (e.g., it has not been removed from the data structure or its memory deallocated). The collect operation may access the collection of indicators using a single transaction or multiple transactions, in different embodiments. If the collect operation attempts to access a given data structure element while another hardware transaction is updating its indicator in order to reclaim its memory (i.e. prior to the hardware transaction that is updating the indicator commits), the collect operation (or a transaction invoked in order to access the given data structure element) may fail and/or be retried.

The techniques described herein may be applied to manage memory for a variety of dynamic-sized concurrent data structures, including, but not limited to, a last-in-first-out (LIFO) stack, a first-in-first-out (FIFO) queue, a linked list, or a dynamic-sized array, in various embodiments.

Figure 1:
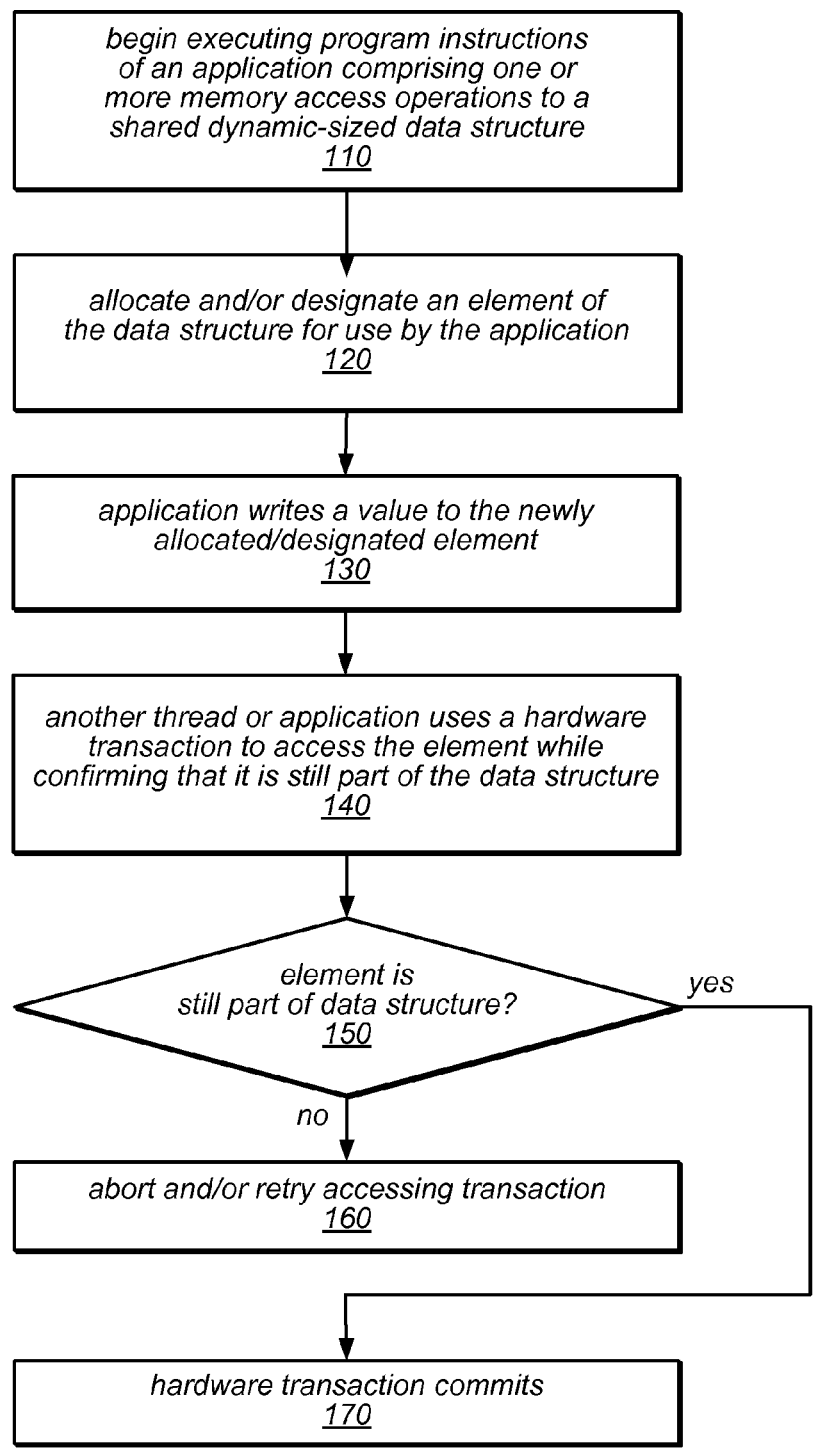
FIG. 1 is a flow diagram illustrating one embodiment of a method for exploiting hardware transactional memory in managing memory for dynamic-sized data structures.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The system and methods described herein may in some embodiments exploit hardware transactional memory (HTM) to simplify and streamline memory reclamation for dynamic-sized shared data structures. For example, in some embodiments, HTM-based algorithms may result in simpler and/or faster solutions for the "dynamic collect" problem that lies at the heart of many modern memory management algorithms, and may demonstrate better memory reclamation properties than prior approaches to this problem. Experimental results have shown that such HTM-based algorithms can, in various embodiments, provide significantly better common-case performance, as well as reduced conceptual complexity. HTM-based implementations of several common concurrent data structures (e.g., a LIFO stack, a lock-free FIFO queue, a linked-list, and a dynamic array) are described herein, and these examples demonstrate that exploiting HTM may significantly simplify the design and implementation of such structures, particularly with respect to dynamic memory management, over traditional hardware synchronization primitives. The HTM-based techniques applied in these examples may be applied in building dynamic-sized concurrent data structures of all types, and may be fundamentally more powerful than traditional hardware synchronization primitives for building such structures.

As used herein, the term transaction may refer to a series of program instructions that are to be executed together as an atomic operation. As described above, if a transaction succeeds (i.e. is successfully committed), then any resulting changes to shared memory may become visible to entities other than the actor. If a transaction does not succeed (i.e. is aborted), then the transaction attempt will have caused no change to any shared memory location. As typically defined, a transactional memory interface may allow a programmer to designate certain sequences of operations as "atomic blocks" or "transactions," which are guaranteed by the transactional memory implementation to either take effect atomically and in their entirety (in which case they are said to succeed), or to be aborted, such that they have no externally visible effect (in which case they are said to fail). In some embodiments, when a compiler encounters a sequence of program instructions designated as "atomic", it may insert calls to various functions defined in a transaction support library that cause the sequence of instructions to be executed as a hardware transaction (i.e. to be guaranteed to execute atomically and in its entirety or not at all by an underlying hardware transactional memory implementation). With transactional memory, it may be possible in many cases to complete multiple operations with no possibility of another thread observing partial results, even without holding any locks.

In the systems described herein, every access to dynamically allocated memory may done in a way that guarantees that the memory has not been deallocated since it was last allocated. If this were not the case, the first access to memory that has been deallocated since it was last allocated may lead to a contradiction. In some embodiments, these techniques may include maintaining an indicator, or a collection of indicators, associated with respective data structures and/or elements thereof to determine whether the associated data structure or element is in use, is expected (or intended) to be in use, and/or is still part of the data structure (e.g., it has not been removed from the data structure or its memory deallocated). In various embodiments, such an indicator may include multiple variables. In some such embodiments, indicator confirmation operations may be "chained" in a transaction, such that one indicator is used to ensure it is safe to access an indicator for another variable that is also accessed within the same transaction. The techniques described herein may be employed in a wide variety of memory management algorithms to ensure that all memory accesses are safe (i.e. that they are guaranteed not to access memory that has been deallocated since it was last allocated), according to various embodiments.

In some embodiments, hardware transactional memory may be exploited to simplify and streamline memory reclamation for dynamic-sized shared data structures, or more generally to ease dynamic memory management. To demonstrate the use of HTM in dynamic memory management, various memory management algorithms have been implemented and evaluated using HTM-enabled hardware. Specifically, the experiments and evaluations described herein for various embodiments of HTM-enabled dynamic memory management techniques were performed on prototypes of the Rock CPU from Sun Microsystems, Inc. While the Rock CPU has certain limitations (e.g., a requirement that transactions cannot perform more store operations than are accommodated by its store buffer), the experiments and evaluations described herein demonstrate that these techniques may be suitable for implementing multiple correct and relatively simple algorithms for dynamic memory management. In contrast, without HTM, it may be significantly more difficult to come up with any correct algorithms, and there may be less flexibility for variants and optimizations. Note that in the examples described herein, the transactional memory may be assumed to be "sandboxed", such that a transaction that dereferences an illegal reference aborts, but does not otherwise disrupt the thread (e.g., by causing a segmentation fault). In other embodiments, the underlying HTM implementation may or may not be sandboxed.

As described in more detail herein, HTM may facilitate memory reclamation for concurrent (i.e. shared) dynamic-sized data structures. For example, by enclosing access operations targeting a shared dynamic-sized data structure (e.g., operations to allocate a data structure element or a reference thereto, update a data structure element or a reference thereto, remove a data structure element or a reference thereto, and/or apply a garbage collection operation to a data structure or references thereto) within one or more hardware transactions, the complexities required in previous algorithms for avoiding, detecting, and/or resolving conflicts during memory management operations may largely be avoided.

One embodiment of a method for exploiting hardware transactional memory in memory management for dynamic-sized data structures is illustrated by the flow diagram in FIG. 1. As illustrated at 110, in this example, the method may include beginning execution of an application that includes memory access operations to a shared dynamic-sized data structure. In various embodiments, these accesses may be made directly (e.g., by reading or writing to an element or node of the shared data structure) or by dereferencing a pointer to an element or node of the shared data structure. The method may include the application (or a thread thereof) allocating and/or designating an element of the data structure for use by the application or thread thereof, as in 120 (i.e. designating that the element is available to be accessed by the application/thread). For example, if memory for one or more additional data structure elements has already been allocated, an available element may be designated for use by the application as part of the data structure. If not, a separate allocation process may be performed prior to designating a new data structure element for the use of the application. In some embodiments, this allocation and/or designation may be performed using a hardware transaction, while in others it may be performed without the use of a transaction. In some embodiments, allocating or designating an element of the data structure may include updating an indicator of its intended use, updating a reference (e.g., a pointer) to the data structure element, and/or updating a reference made by the data structure element. Such an indicator or reference may be included in the data structure element itself or may be located in another data structure and/or memory location, in various embodiments.

In some embodiments, the application (or thread thereof) that designated the element of the data structure for the use of the application may write a value to the newly allocated/designated data structure element, as in 130. For example, in some embodiments, the application/thread may initialize the value of the element prior to making it visible to other applications/threads. In some embodiments, such an initialization operation may be performed using a hardware transaction, while in others it may be performed without the use of a transaction.

Once the new data structure element has been allocated and/or designated for use, another thread or application may use a hardware transaction to access the element while confirming that it is still part of the data structure (i.e. confirming that it has not been removed from the data structure and/or that its memory has not yet been deallocated), as in 140. For example, the application may include program instructions that are executable by a computer system (or a computing node thereof) to invoke functions of a transaction support library that exploits a hardware transactional memory implemented in the computer system to write a new value to the data structure element or read the data structure element. If the data structure element is still part of the data structure, shown as the positive exit from 150, the hardware transaction used to access the element may commit, as in 170. In this example, if the data structure element is not still part of the data structure (or if this cannot be confirmed), shown as the negative exit from 150, the hardware transaction used to access the element may be aborted and/or retried, as in 160. In other embodiments, the transaction may be committed without performing the write (since it cannot be confirmed that the data structure element is still part of the data structure), or other actions may be taken in response to an inability to confirm that the data structure element is still part of the data structure. Note that while the data structure element remains allocated/designated for the use of the application or thread, its value may be updated or read by one or more applications or threads multiple times (not shown), and each such access may be performed using a transaction to confirm that it is still part of the data structure.

In some embodiments, at any point after designating that the data structure element is available to be accessed by the application/thread, the application/thread may indicate that the data structure element is no longer needed by the application or thread (not shown). For example, the application may update an indicator of its intended use, a reference to the data structure element and/or a reference made by the data structure element, in different embodiments. Thereafter, if another transaction (e.g., a transaction of a concurrent application or thread having access to the data structure) attempts to access the data structure element, this accessing transaction may be aborted and/or retried, in some embodiments. In other embodiments, the transaction may be committed without performing the write (since the data structure element is not still part of the data structure), or other actions may be taken in response to determining that the data structure element is not still part of the data structure. After indicating that the data structure element is no longer needed by the application or thread, the application/thread may free the memory for the element and/or cause it to be freed (e.g., by marking it as unused). In some embodiments, updating an indicator or reference to reflect that a data structure element may be freed (i.e. that its memory may be reclaimed by the operating system) may be performed using a transaction. In such embodiments, the memory may be freed by the instructions executed within the hardware transaction that designates the data structure element as no longer in use, or may be freed following the commitment of that hardware transaction, in different embodiments.

Systems and methods for exploiting hardware transactional memory to simplify and/or improve the performance of concurrent dynamic-sized data structures and the management of memory for those data structures may be described in more detail using the following examples. The first example demonstrates how hardware transactional memory may be exploited to implement a lock-free last-in-first-out (LIFO) stack. One such LIFO stack uses a "top of stack" (TOS) pointer that points to the most recently pushed node in a linked list. This data structure uses CAS type operations for PUSH and POP operations in relatively straightforward ways, with a few complications. For example, an operation to remove the first node from the list (e.g., for a POP operation), needs to know what to set the TOS pointer to, which can be determined by reading the "next field" of the first node (i.e. the node identified by TOS). However, by the time the CAS operation is performed on TOS, multiple other operations may have taken place. In some cases, the same first node may be indicated by TOS (therefore, the CAS operation will succeed), but now there may be a different second node, so the successful CAS operation loses some nodes, and may even reinstate some old ones that have already been removed.

In some systems, to avoid this problem, TOS may be augmented with a version number that is incremented every time TOS is modified. In other embodiments, it may be sufficient to increment such a version number only on one type of operation (i.e. PUSH or POP, but not both). While the inclusion of the version number may avoid an incorrect CAS succeeding, it does not address the issue that a POP operation has to access (albeit read only) the "next" field of a node that may have been removed. Thus, this algorithm may not be safe to use in systems in which a freed piece of memory may be returned to the operating system, such that even reading from it may cause a segmentation violation or other error.

In some embodiments, an HTM-based version of the LIFO stack may address both problems. In such embodiments, the POP operation may be required to be performed in a hardware transaction. In such embodiments, a version number may not be needed to ensure correct operation because the POP operation (due to being performed in a transaction) will confirm that the new TOS (i.e. after the transaction commits) points to the node that was second in the list before the transaction. In addition, because the "next" pointer of the first node is read inside a transaction that confirms that it is still the first node (as indicated by TOS), the algorithm avoids reading from a memory location that has been deallocated.

In this context, the TOS pointer serves as an indicator that a node is still part of the LIFO stack. Note that in some embodiments, the PUSH operation could still use a CAS type operation to introduce a new node. However, accesses to dynamically allocated memory (i.e. nodes that are part of the LIFO stack) may be required to be performed inside a hardware transaction that also reads the indicator to confirm that the accessed node has not already been removed.

In another embodiment, a LIFO stack algorithm may just use a pointer to a block of memory as an indicator that the block of memory is current (i.e. has not been deallocated or otherwise made unavailable). In such embodiments, the algorithm may allow operations to read and/or modify the contents of the block while it is current, and may occasionally replace the block with a new one whose contents do not depend on the contents of the current one. In this case, all modifications of the indicator could be done using CAS type operations. In this example, only the operations that access the current block would be required to use hardware transactions to read the indicator and make sure they are accessing the right block. However, other operations may also be performed using hardware transactions.

The next example demonstrates how hardware transactional memory may be exploited to implement a lock-free first-in-first-out (FIFO) queue. In this example, the queue is represented as a linked list of entries that are allocated dynamically as values are enqueued. Any practical implementation of this algorithm must address the question of how the memory for these entries can be reused. This may be challenging if the algorithm allows a queue node to be accessed by ongoing operations even after the node has been removed from the queue. In some prior solutions each thread keeps a thread-local pool of unused entries. When a thread enqueues an item, it allocates an entry from its local pool whenever possible. When a thread dequeues a value, it returns the dequeued entry to its own pool. However, using this approach, once an entry has been allocated, that memory cannot be used for any purpose other than as a queue entry. Therefore, even in a quiescent state, when no method calls of the queue are in progress, the memory used for the queue is at least proportional to the historical maximal queue size, which is a significant disadvantage. Other previous approaches enable memory allocated to the linked list to be reclaimed, but they typically entail significant additional overhead and complexity.

In some embodiments, a concurrent lock-free FIFO queue that is superior to previous state-of-the-art implementations in terms of algorithmic complexity, performance, and space requirements may be implemented by enclosing sequential code for enqueue and dequeue methods in hardware transactions. In such embodiments, a successful dequeue operation frees the dequeued entry's memory to the operating system. No transaction serialized after the dequeue operation will see a reference to that entry, so the only danger is that a concurrent transaction (i.e. one that is executing concurrent to the transaction implementing the dequeue operation) may try to use it. However, since the dequeue operation uses a hardware transaction, if another transaction attempts to use the entry being dequeued before the hardware transaction of the dequeue operation commits, this may cause a conflict. In some embodiments, the dequeue operation itself may be aborted or the other transaction may be guaranteed to abort. In still other embodiments, the hardware transactional memory may ensure that both commit, but that they commit in the correct order (e.g., with the other transaction attempting to access the entry committing first, followed by the transaction performing the dequeue operation). Moreover, this HTM-based algorithm is significantly simpler than previous algorithms, some of which must deal with certain race conditions that cannot occur when operations are executed within hardware transactions, as well as with the ABA problem that may arise in those algorithms due to recycling queue nodes. Experiments have shown that the HTM-based queue can correctly reclaim unused entries, and may be up to 25% faster than previous lock-free FIFO queues (when a mix of enqueue and dequeue operations is performed on the queue) due to its simpler code.

Figure 2A:
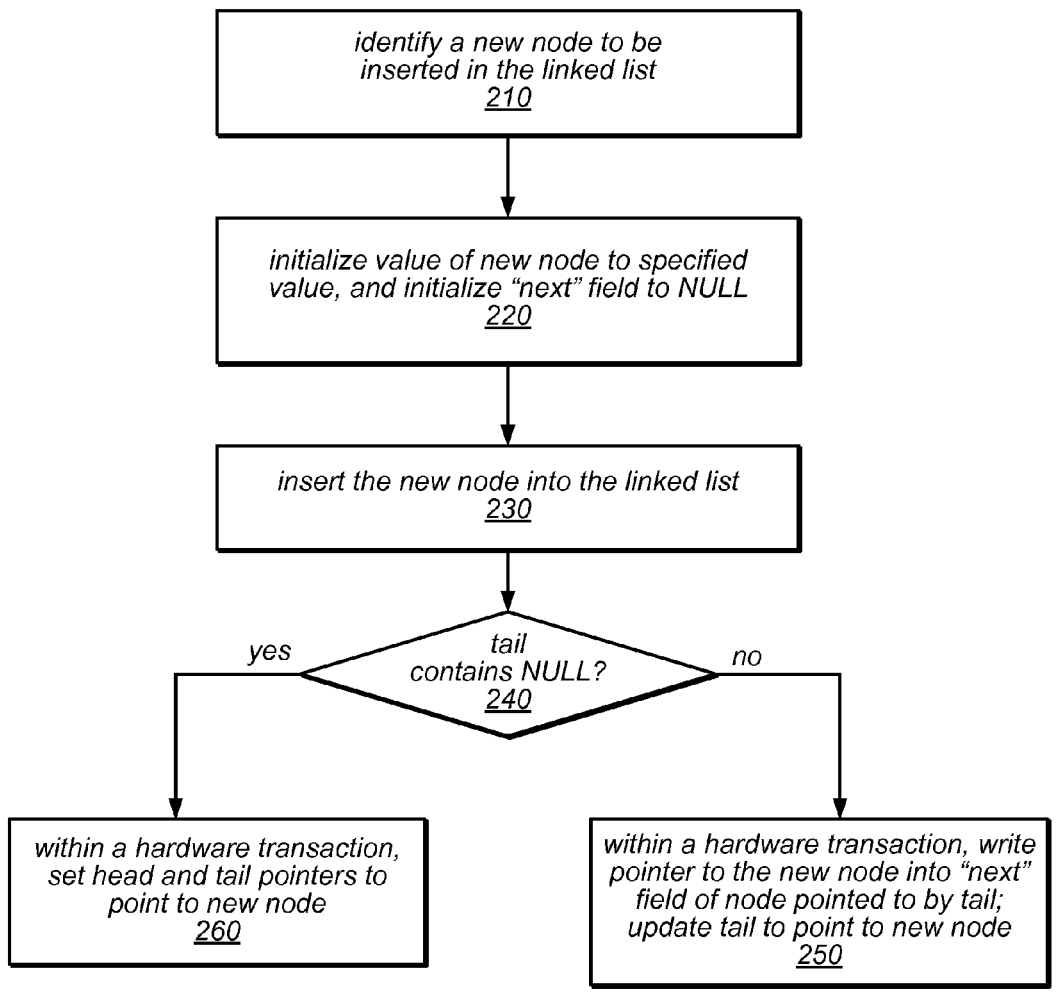
FIGS. 2A and 2B are flow diagrams illustrating embodiments of an enqueue operation and a dequeue operation for a concurrent FIFO queue, respectively.
Figure 2B:
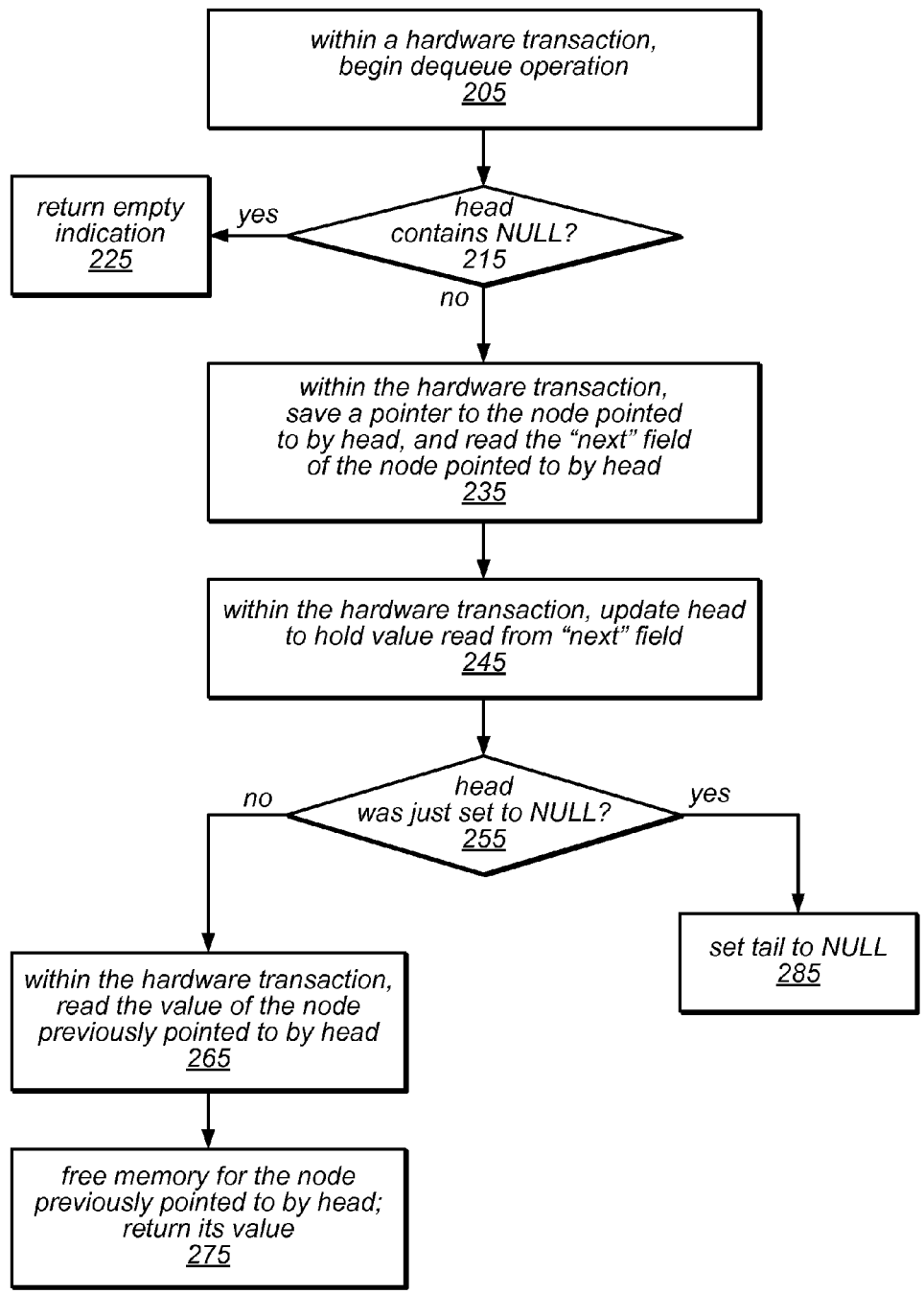

FIGS. 2A and 2B illustrate an enqueue operation and a dequeue operation, respectively, for one embodiment of a concurrent FIFO queue that exploits hardware transactions. In this example, the queue includes "head" and "tail" pointers, each of which points to a linked list node that contains a value field and a pointer to the next list node. When the queue is empty, both of these fields contain NULL pointers. As described above, sequential code for enqueuing or dequeuing a node of a linked list may be enclosed within a hardware transaction, which may simplify memory management (including memory reclamation) for this dynamic data structure. As illustrated at 210 in FIG. 2A, the enqueue operation may include identifying a new node for the linked list (which may include allocating a new node, if none is available). In this example, prior to inserting the new node into the linked list, the value of the new node may be initialized to a specified value (e.g., a value specified as an input to the enqueue operation), and the "next" field of the new node may be initialized to NULL, as in 220. The new node may then be inserted (i.e. appended) in the linked list (and thus, the FIFO queue), as in 230. In some embodiments, appending a new node in the linked list may be performed within a transaction, while in other embodiments a transaction may not be required for this operation. Also note that in some embodiments initializing the value of the new node may be performed within a transaction, while in other embodiments a transaction may not be required for this operation. In embodiments in which a single hardware transaction is used to perform both the insertion of the new node in the linked list and the initialization of that node, the order of these two operations may be irrelevant.

If the tail of the linked list contains a value of NULL, shown as the positive exit from 240, the head and tail pointers may both be set to point to the new node, as in 260, and this may also be performed by instructions enclosed within a hardware transaction (e.g., the same hardware transaction, if any, used to insert and/or initialize the new node, or another transaction that updates the head and tail pointers while confirming that they are still part of the linked list). If the tail of the data structure does not contain a value of NULL (shown as the negative exit from 240), a pointer to the new node may be written into the "next" field of the node pointed to by the tail, and the tail may be updated to point to the new node, as in 250. Again, these operations may be performed by instructions enclosed within a hardware transaction (e.g., the same hardware transaction, if any, used to insert and/or initialize the new node, or another transaction that updates the "next" field and the tail pointer while confirming that these elements are still part of the linked list).

As illustrated at 205 in FIG. 2B, the dequeue operation may be performed by program instructions enclosed within a hardware transaction. If the head of the linked list contains a value of NULL (shown as the positive exit from 215), the dequeue operation may return an indication that the linked list (i.e. the FIFO queue) is empty, as in 225. If the head of the linked list does not contain a value of NULL (shown as the negative exit from 215), the dequeue operation may include saving a pointer to the node pointed to by the head of the linked list, reading the "next" field of the node pointed to by the head of the linked list (as in 235), and updating the head of the linked list to hold the value read from the "next" field (as in 245). If this operation sets the head to a value of NULL (e.g., if the value read from the "next" field of the node pointed to by the head was NULL), this may indicate that the node pointed to by the head was the only node in the queue. In this case, shown as the positive exit from 255, the dequeue operation may include setting the value of the tail to NULL, as in 285. If the head was not set to a value of NULL by the operation in 245 (shown as the negative exit from 255), this may indicate that the node pointed to by the head was not the only node in the queue. In some embodiments, the dequeue operation may include reading the value of the node previously pointed to by the head (as in 265), freeing the memory for the node previously pointed to by the head, and returning its value (as in 275). Note that in some embodiments, this may be the case whether or not the node pointed to by the head was the only node in the queue. Note also that in other embodiments, the operations illustrated as 265 and 275 in FIG. 2B may be performed after the hardware transaction commits, rather than within the hardware transaction.

Using the techniques described herein, every access to dynamically allocated memory may be done in a way that guarantees that the memory has not been deallocated since it was last allocated. In the FIFO queue algorithm described above, the accesses to dynamically allocated memory include: 1. The initialization of a newly allocated node before it is appended to the list (which may be performed transactionally or non-transactionally, in different embodiments); 2. The write to the "next" field of the last node in the list when enqueueing a new node; and 3. The read of the value field of a node that is removed by a dequeue operation (which may be performed transactionally or non-transactionally, in different embodiments).

As noted above, in some embodiments memory access 1 could be performed safely as a non-transactional access. In such embodiments, the node can be initialized after it has been allocated and before it has been added to the queue, in which case there is no risk that the node will be removed and freed before it is initialized. Similarly, memory access 3 could be performed safely as a non-transactional access because this access is only performed by a thread that removes the node from the queue and will subsequently deallocate it. In this case, because the thread knows that the node has not been deallocated yet, it can safely read the value from the node.

In some embodiments, however, memory access 2 must be performed transactionally. More specifically, it must be performed in a transaction that confirms that the node whose next pointer is being modified is still the last node in the list (i.e., is pointed to by the tail pointer). This may be necessary to retain the simplicity of the algorithm while allowing removed nodes to be deallocated. For example, without this check, there may be a risk that the node would be removed from the list and deallocated after the enqueueing thread has identified the node and before it updates its next pointer. In this example, the tail pointer variable may be used as an indicator that the node it points to has not been deallocated, and accesses to this node are made safe by performing them in hardware transactions that confirm the indication.

Note that, for the purposes of the discussion above, it is assumed that the head and tail pointers themselves are statically allocated and therefore are always safe to access. In embodiments that apply the techniques described herein at another level, the algorithm may dynamically allocate queues including their head and tail pointers, etc. In such embodiments, another indicator may be used to confirm that the queue still exists if an operation is performed on it. In other embodiments, other application specific mechanisms could be used for this purpose.

As noted above, some previous algorithms may enable a concurrent data structure (e.g., a previous lock-free queue) to return memory to the system when it is no longer needed. Some of these techniques require a thread to "announce" its intention to use a reference before using it. In such implementations, before a thread can free a block of memory, it must check that no other thread has announced an intention to access that block. This check may amount to performing a "collect" operation over a set of announced references to ensure that a block to be freed is not potentially in use.

Figure 3:
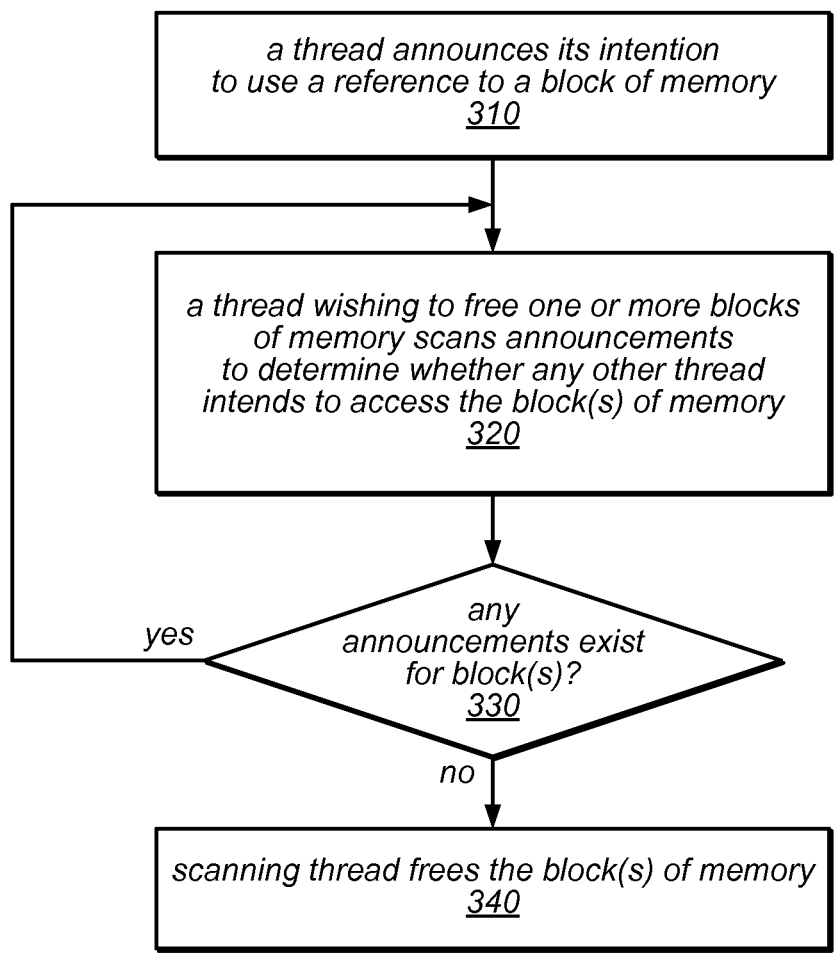
FIG. 3 is a flow diagram illustrating one embodiment of a method for using announcements of the intended use of a shared data structure.

One embodiment of a method for using such announcements is illustrated in FIG. 3. As illustrated at 310, in this example, the method may include a thread announcing its intention to use a reference to a block of memory. For example, the thread may update a pointer to point to the block of memory, may update a reference counter for the block of memory, or may otherwise indicate that it intends to reference the block of memory, in different embodiments. Subsequent to the announcement, a thread wishing to free the block of memory and/or other blocks of memory (e.g., a thread performing a garbage collection operation) may scan a collection of such announcements to determine whether any other thread intends to access the block(s) of memory, as in 320.

If any announcements exist for the block(s), shown as the positive exit from 330, the scanning (and/or garbage collection) operation may be retried (i.e. the attempt to free the block(s) of memory may be repeated one or more times), in some embodiments. This is illustrated in FIG. 3 by the feedback from 330 to 320. For example, if the thread that announced its intention to reference a block of memory at 310 has not indicated otherwise, its announcement may still exist. Alternatively, if the thread that announced its intention to reference the block of memory at 310 has indicated that it no longer intends to access the block of memory, but one or more other threads have announced their intention to reference the block of memory, there may be one or more existing announcements for this block of memory. In other embodiments, rather than the scanning thread repeating its attempt to free this particular block (or collection of blocks) of memory, the scanning thread may abort its attempt (or simply return an indication of failure), or may continue to attempt to free one or more other blocks of memory (dependent on whether any announcements exist for those blocks of memory). If no announcements exist for the block(s) of memory, shown as the negative exit from 330, the scanning thread may free the block(s) of memory, as in 340.

While techniques that employ announcements can enable memory reuse, they have memory requirements of their own. In particular, in a system that employs these techniques, each active thread requires a separate location in which to announce a pointer it intends to access. Unless these locations themselves can be reclaimed and recycled, algorithms that use these techniques inherit another form of historical space requirement, namely that (even in a quiescent state) the memory consumption of the data structure is at least proportional to its current size plus the historical maximum number of active threads. To overcome this limitation, dynamic versions of these techniques have been proposed that allow locations used for announcements to be released and recycled. These memory management techniques encompass various "dynamic collect" algorithms. In systems that employ dynamic collect algorithms, a thread may announce its intention to dereference a pointer by using register and/or update operations, and may scan for other threads' announcements using a collect operation. Any fundamental limitation of dynamic collect algorithms may be inherited by any data structure that uses these approaches to manage memory. As described herein, in some embodiments, HTM-based algorithms may facilitate memory reclamation for data structures that employ dynamic collect techniques, and may overcome the inherent limitations of non-HTM systems in supporting dynamic concurrent data structures.

Figure 4:
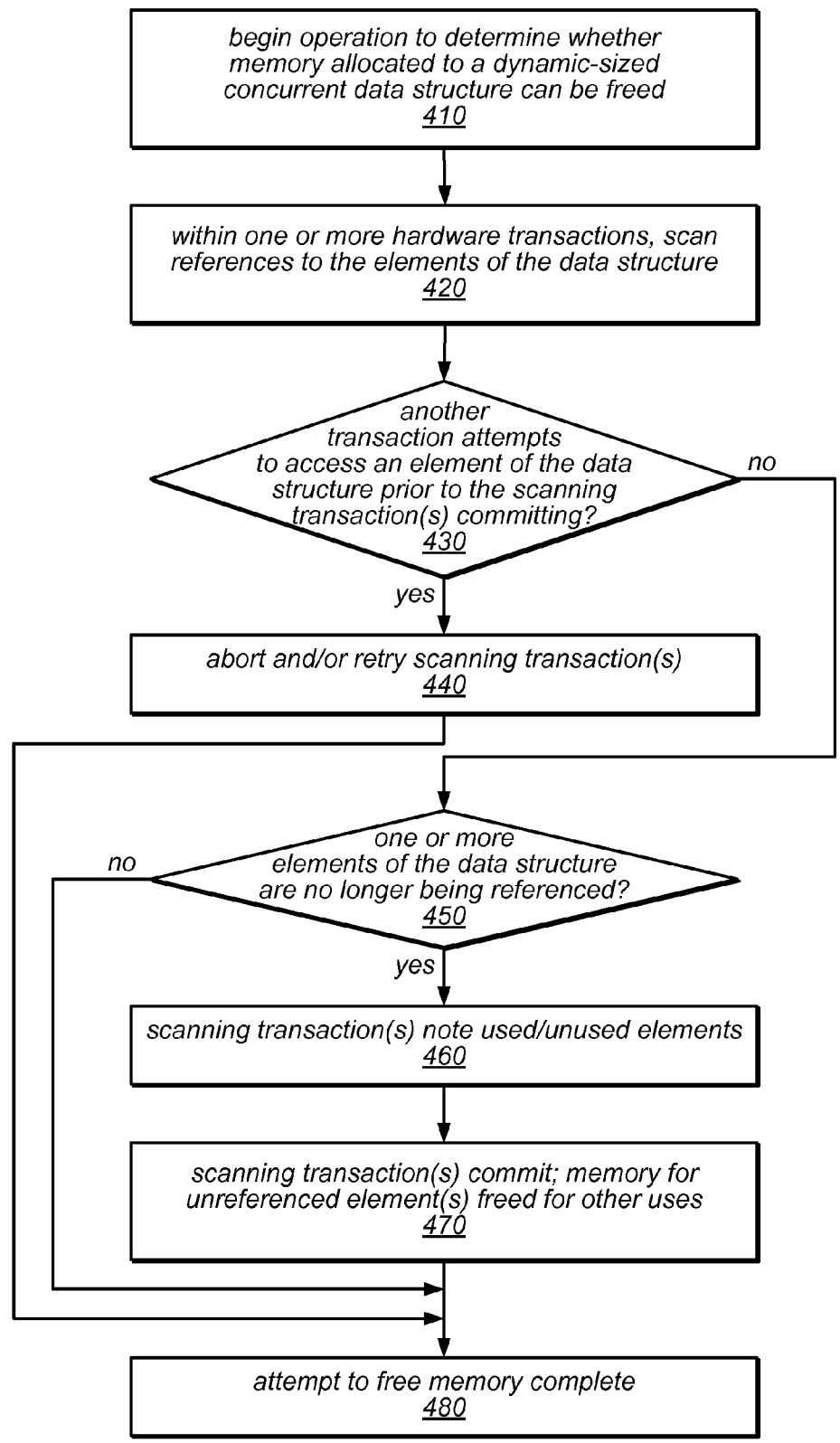
FIG. 4 is a flow diagram illustrating one embodiment of a method for using hardware transactions to implement, and manage memory for, a dynamic-sized concurrent data structure.

FIG. 4 illustrates one embodiment of a method for using hardware transactions to implement, and more specifically to manage memory for, a dynamic-sized concurrent data structure. In this example, an operation (within a given application or thread thereof) to determine whether memory allocated to a dynamic-sized concurrent data structure can be freed is begun at 410. The operation may include, within one or more hardware transaction, scanning references to the elements of the data structure, as in 420. For example, this may include examining the value of an indicator of intended use by the application or by a thread thereof. Such an indicator may be located within the data structure element itself or may be located in a separate data structure or memory location, in different embodiments, and may include a reference counter, a pointer, or value usable to indicate that the data structure element may potentially be in use. In some embodiments, scanning an indicator of a data structure may include returning a data value, a pointer value, a reference count, an index value, and/or other information indicating whether the data structure element is potentially in use. In some embodiments, multiple hardware transactions may be employed to scan the references to the elements of the data structure, with each hardware transaction examining the reference (or references) to a single element of the data structure. In other embodiments, each hardware transaction may examine the reference (or references) to two or more elements of the data structure, or a single hardware transaction may examine the references to all of the elements of the data structure.

In this example, if another transaction (e.g., a transaction of another application or a different thread of the same application) accesses (or attempts to access) an element of the data structure prior to the scanning transaction(s) committing, shown as the positive exit from 430, the scanning transaction(s) may be aborted and/or retried, as in 440. For example, the other transaction may perform an operation to allocate or delegate a new element in the data structure, to update a value of an element in the data structure, or to update a reference to (or a reference made by) the data structure while a scanning transaction is accessing that data structure element. In some embodiments, such a conflict may cause the scanning transaction to be aborted, but may allow other scanning transactions within the dynamic collect operation to be performed. In other embodiments, such a conflict may cause the entire dynamic collect operation to fail and/or be restarted.

If no other transactions conflict with the scanning transaction(s) and they commit successfully, shown as the negative exit from 430, the operation may include determining whether any elements of the data structure are no longer being referenced, as in 450. For example, in some embodiments, the scanning transaction(s) may collect information about the data structure elements that are currently being referenced, and any data structure elements not currently being referenced may be candidates for memory reclamation. If one or more elements of the data structure are no longer being referenced, shown as the positive exit from 450, the scanning transaction(s) may note the elements of the data structure that are and/or are not currently being used, as in 460. For example, in various embodiments the scanning transaction(s) may return information about the data structure elements that are currently being referenced, return information identifying the data structure elements that are not currently being referenced, store an indication that a particular data structure element is no longer being referenced, remove or unlink a data structure element that is no longer being referenced, and/or take other actions to indicate which data structure elements are and/or are not candidates for memory reclamation.

After noting which elements of the data structure are or are not candidates for memory reclamation, the scanning transaction(s) may commit, and the memory for the unreferenced data structure elements may be freed for other uses, as in 470. For example, the method the memory for the unreferenced data structure elements may be returned to or reclaimed by the operating system, in some embodiments. Note that in different embodiments, the memory may be freed by the instructions executed within the hardware transaction that designates the data structure element to be freed (e.g., one of the scanning transactions), or may be freed following the commitment of that hardware transaction. Once memory for any unreferenced elements of the data structure has been freed (or if there were no data structure elements for which memory could be freed, shown as the negative exit from 450), the attempt to free memory used by the dynamic-sized concurrent data structure may be complete, as in 480.

As previously noted, dynamic collect algorithms may allow locations used for announcements to be released and recycled. These algorithms may take a variety of forms, some of which are described below. In general, these algorithms operate on "collect objects" to announce (or register) an intent to use a dynamic data structure or an element thereof, to update the contents of a dynamic data structure or an element thereof, to indicate that a data structure or element thereof is no longer needed (e.g., to deregister the data structure or element), or to collect information about registered data structures and/or elements thereof. In some embodiments, a dynamic collect object may use two data types, "handle" and "value", and may support the following operations:

h=register(v): This operation binds a value v to an unused handle h, which is returned to the caller.
    update(h,v): This operation binds a value v to handle h.
    deregister (h): This operation removes the current binding to handle h.
    collect( ): This operation returns a set of (handle, value) pairs for registered handles.

In some embodiments, clients of a dynamic collect algorithm may be considered "well-formed" if they conform to certain well-formedness constraints. For example, a handle h may be registered to a thread t when it is returned by an invocation by t of register(v) for some v, and it may be deregistered when deregister(h) is invoked. In this example, well-formedness constraints may dictate that a thread may invoke an update operation or a deregister operation only with a handle that has previously been registered to it, and which it has not since deregistered. In some embodiments, any thread may invoke a collect operation on a dynamic collect object at any time, unless it is currently performing another operation on the dynamic collect object. Following standard definitions, there is a natural partial order on operations: if the invocation event of an operation op0 occurs after the return event of another operation op1, then op0 is said to follow op1, and op1 is said to precede op0. If neither precedes the other, the operations are said to be concurrent. In some embodiments, a call to a register operation by a thread t must return a handle that is not registered to any other thread. Together with the well-formedness requirements stated above, this implies that register and update operations for a given handle h are totally ordered by the "precedes" relationship. Thus, if any such operations precede an operation op, then there is a unique "last" one of them. If such a last operation exists and there is no deregister(h) operation following it and preceding an operation op, the last operation may be denoted as lastbind (h, op). Otherwise lastbind(h, op) may not be defined.

In some embodiments, a handle-value pair (h,v) may "flicker" during a register(v) or update(h,v) call. In such cases, a concurrent collect call may or may not return the handle-value pair. However, if a register or update operation completes before the invocation of a collect operation, and the handle has not been subsequently deregistered, then the collect operation must return a value for that handle (either v or another value v' if there has been a subsequent update(h, v') operation). More precisely, a collect operation cop may return a set S of handle-value pairs such that the following conditions hold for every handle h and value v:

If (h,v)∈S, then either
        lastbind(h, cop) is defined and is a register or update operation, or
        a register or update operation was concurrent with cop.
    If lastbind(h, cop) is defined and there is no corresponding deregister operation for h that is concurrent with cop, then (h, v')∈S, for some value v'.

Note that the specification above may be non-deterministic. In other words, in some embodiments there may be multiple (different) sets of handle-value pairs that can legitimately be returned by a given collect call. Furthermore, this specification may not preclude a collect operation returning multiple handle-value pairs for the same handle h, in some embodiments. In such embodiments, clients may be able to filter out duplicates (if necessary) by choosing any one of the handle-value pairs for each handle in the returned set. In some embodiments, there may be small variations on the dynamic collect object specification described above. For example, an alternative register operation may return a handle without binding it to a value, or a collect operation may omit the handles and simply return a multi-set of values associated with registered handles. However, the specification described above is suitable for a variety of use cases, including for use in memory management mechanisms, and such minor variations in the specification may not have a significant impact on the effectiveness of the techniques described herein.

Two kinds of list-based dynamic collect algorithms that exploit hardware transactional memory are described herein. One is referred to herein as "hand-over-hand reference counting" (or HOHRC), and the other is referred to herein as "fast collect". In the example embodiments described below, each uses a doubly-linked list with one value per node.

In various embodiments, the HOHRC algorithm may use a per-node reference count to "pin" a node (i.e. to prevent it from being deallocated) while a collect is accessing its value. In one such embodiment, the collect operation traverses the list, using short transactions to increment the reference count of a node n while atomically confirming that n's predecessor still points to it. As the predecessor has previously been pinned, this may ensure that node n is still part of the collect object. After incrementing n's reference count, the collect operation may read n's value non-transactionally, and may copy it to the result set. It may then unpin n's predecessor, using a transaction to decrement its reference count, and, in some cases, unlink it from the list and deallocate the memory allocated to it. In some embodiments, including the example illustrated in FIGS. 5A-5C, a register operation may allocate and populate a new node, an update operation may store a new value into the node, and a deregister operation may set a delete marker of the node that is to be deregistered. If the node's reference count is zero, the deregister operation may unlink the node from the list and deallocate it.

Figure 5A:
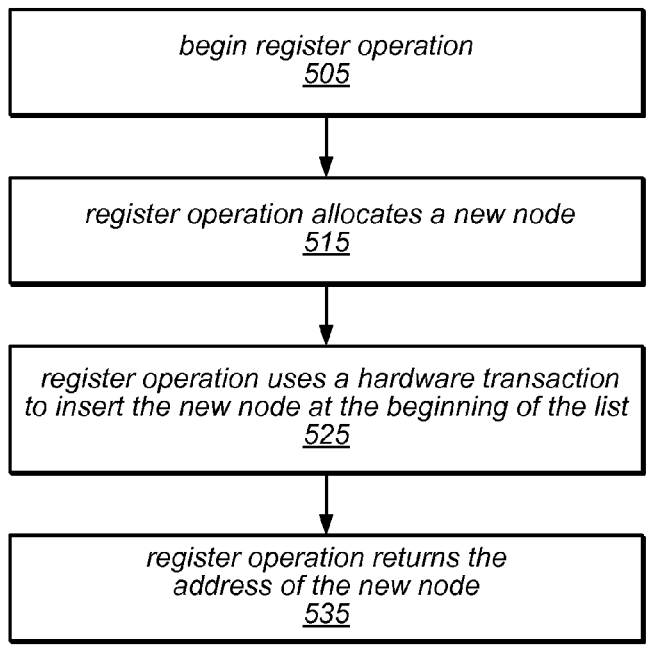
FIGS. 5A-5C are flow diagrams illustrating register, deregister, and collect operations for a dynamic-sized linked list, according to one embodiment.
Figure 5B:
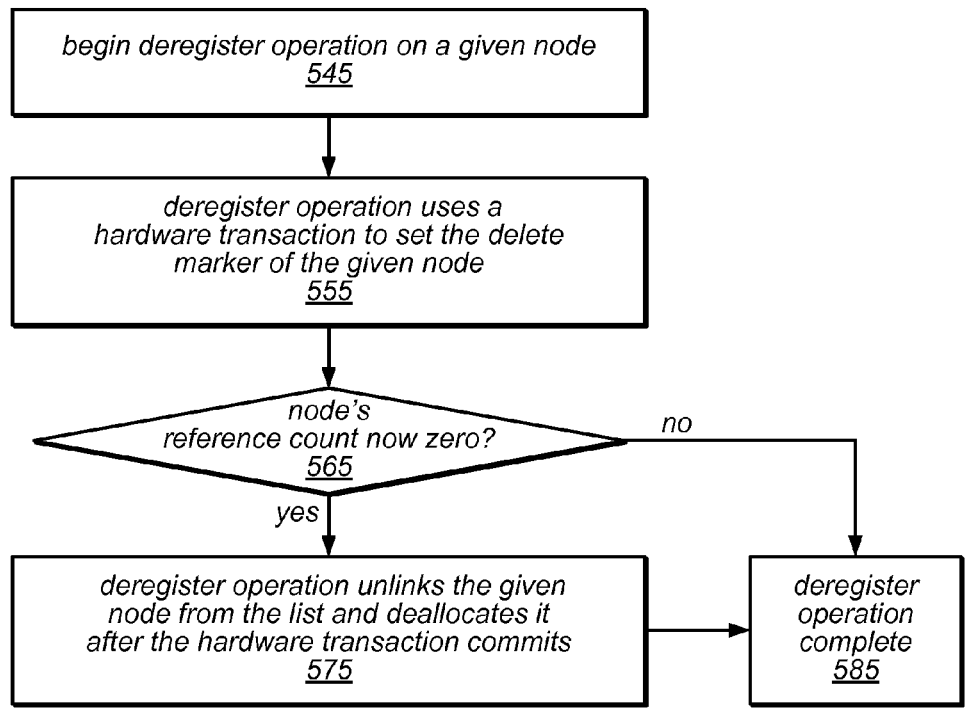
Figure 5C:
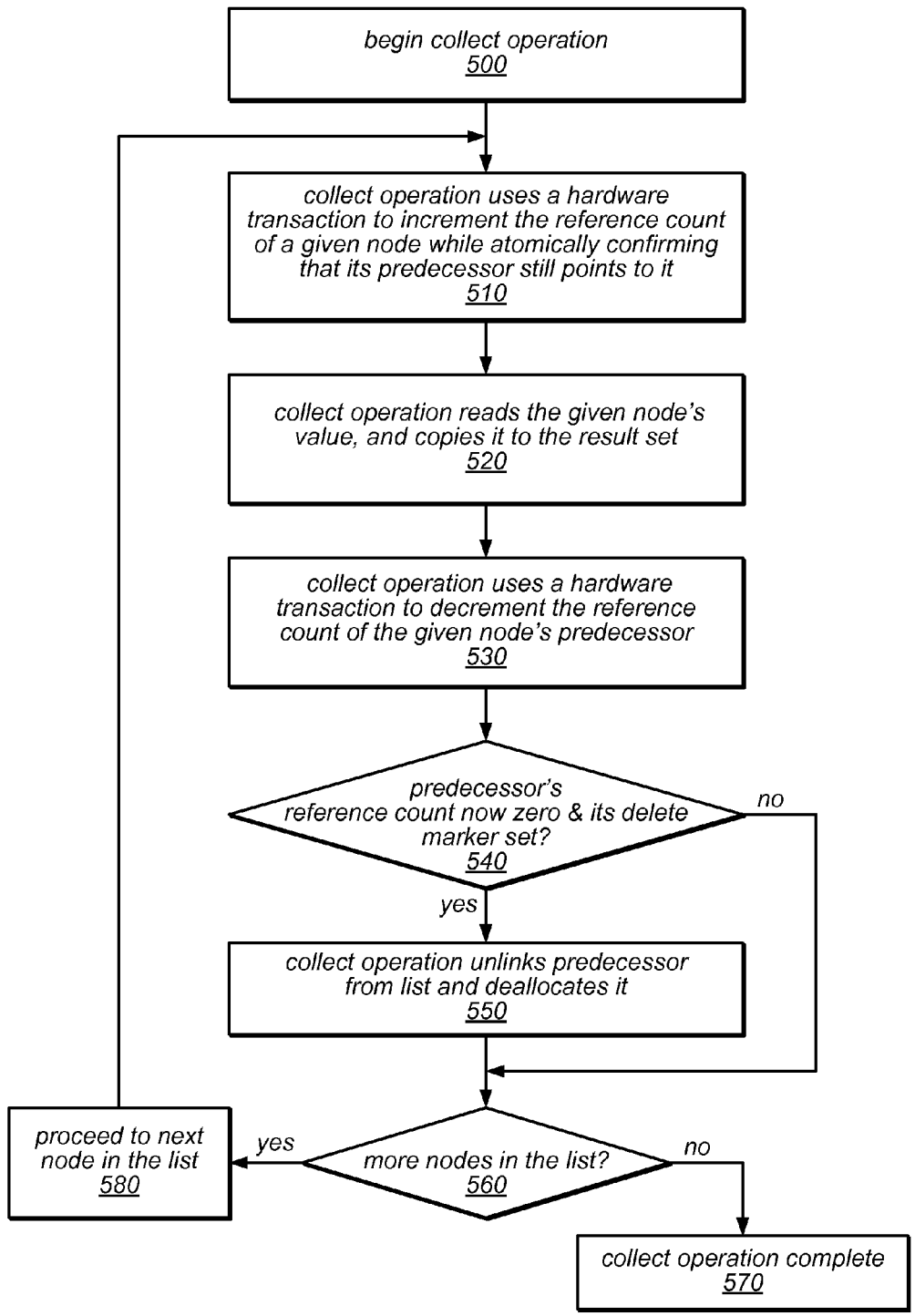

FIGS. 5A-5C illustrate register, deregister, and collect operations, according to one embodiment. As illustrated in FIG. 5A, a register operation of an application, or a thread thereof (shown as beginning at 505), may include allocating a new node (as in 515), and then using a hardware transaction to insert the new node at the beginning of the list (as in 525). The register operation may also return the address of the new node, as in 535. In this example, only the operation to insert the new node into the list is performed within a hardware transaction. However, in other embodiments, program instructions to perform the operations to allocate the new node and/or to return its address may also be enclosed within the hardware transaction, or other operations (not shown) may be enclosed within the hardware transaction.

As illustrated in FIG. 5B, a deregister operation on a given node of a linked list (which begins at 545) may use a hardware transaction to set a delete marker of the given node (as in 555), which may indicate that the node is no longer needed by the application or thread that registered the given node. For example, the application (or thread thereof) that registered the given node may no longer need the given node. However, one or more other applications (or threads) may still be referencing the given node. If the hardware transaction determines that the value of the reference counter for the given node is zero, shown as the positive exit from 565, this may indicate that no other applications or threads are currently referencing the given node. In this case, the given node may be unlinked from the linked list and deallocated (which may include its memory being freed to the operating system), as in 575. In this example, the program instructions for unlinking the given node from the linked list may be enclosed in the hardware transaction, while the program instructions for deallocating the given node may be executed after the hardware transaction commits. In other embodiments, both operations may be performed by program instructions enclosed in the hardware transaction, and/or other operations (not shown) may be enclosed within the hardware transaction.

If the hardware transaction determines that the value of the reference count for the node is not zero, shown as the negative exit from 565, this may indicate that one or more other applications or thread is currently referencing the node. For example, an ongoing collect operation may have pinned the node. In this case, the deregister operation may not be able to unlink or deallocate the given node, and the last collect operation that unpins the node may unlink and/or deallocate it. Once the deregister operation has unlinked and deallocated the given node (or if the given node cannot yet be unlinked or deallocated, as indicated by the value of its reference count), the deregister operation is complete, as in 585.

FIG. 5C illustrates one embodiment of a collect operation, which begins at 500. As illustrated in this example, a collect operation may include using a hardware transaction to increment the reference count of a given node while atomically confirming that its predecessor still points to it, as in 510. The collect operation may include reading the value of the given node and copying the value to its result set, as in 520. In some embodiments, these read operations may be performed transactionally, while in other embodiments they may be performed non-transactionally. As illustrated in this example, the collect operation may use another hardware transaction to decrement the reference count of the predecessor of the given node, as in 540. If the value of the reference count of the predecessor of the given node is now zero and its delete marker is set, shown as the positive exit from 540, the predecessor node may be unlinked from the linked list and deallocated (which may include the memory for the predecessor node being freed to the operating system), as in 550. If the value of the reference count of the predecessor of the given node is not zero and/or its delete marker is not set, shown as the negative exit from 540, the predecessor node may not yet be unlinked from the linked list or deallocated.

If there are more nodes in the linked list, shown as the positive exit from 560, the method may include proceeding to the next node in the linked list (as indexed by the decremented reference count), as in 580. In other words, the operations illustrated as 510-550 may be repeated for each of the other nodes in the linked list, in order. This is illustrated in FIG. 5C by the feedback from 580 to 510. In this example, each hardware transaction executed as part of the collect operation examines a single node of the linked list. In other embodiments, two or more nodes may be examined within a single hardware transaction. Once the collect operation has traversed the linked list, shown as the negative exit from 560, it may be complete, as in 570. Note that a given node may be continually pinned and thus never reclaimed. However, each collect operation can pin at most two nodes at a time. Therefore, the shared memory used at any given time may only be proportional to the number of active handles plus the number of ongoing collect operations.

Note that the collect operation of the HOHRC algorithm described above updates each list node twice. In some embodiments, this may increase the cost of the collect operation (as compared to other collect operations), cause significant memory coherence traffic, and/or cause transactions used by collect operations to conflict with each other. A telescoping technique, such as that described below, may in some embodiments reduce these effects, but may not be able to fully eliminate them.

Note also that the description above assumes that values stored by update operations fit into a word that can be written and read by a native machine instruction, a significant advantage when update operations are frequent. This advantage stems from the fact that the storage for a given handle does not move during the lifetime of the handle, which may allow updates to be performed non-transactionally. The array-based algorithms described below may depend on the ability to move the storage for a handle, and thus may require update operations to use transactions to confirm the location of the storage.

In some embodiments, the reference counter in the previous example may be replaced with a Scalable Non Zero Indicator (SNZI) object to improve performance. In such embodiments, the incrementing of the reference counter may be replaced with an Arrive operation, the decrementing of the reference counter may be replaced with a Depart operation, and the test to determine whether the counter is zero may be replaced with a Query operation.

In some embodiments, the fast collect algorithm described herein may improve collect performance when deregister operations are infrequent. This algorithm may use the same register and update operations as the HOHRC algorithm described above. However, it may dispense with the reference counts used by the HOHRC algorithm. For example, in some embodiments of the fast collect algorithm, the deregister operation may use a transaction to atomically unlink a node and increment a shared deregister counter, and then may deallocate the node immediately afterwards. In such embodiments, the collect operation may traverse the list using transactions to atomically read the current value of the shared deregister counter and the next node in the list. If the value of the shared deregister counter has changed since the start of the collect operation, the collect operation may be restarted from the beginning. Note that in some embodiments of the fast collect algorithm, collect operations can be prevented from making any progress by concurrent deregister operations. However, a variety of practical approaches may be employed to address this problem, in different embodiments. For example, a mode may be added in which deregister operations add nodes to a to-be-freed list that is freed by a collect operation after it completes. In this example, hardware transactional memory may facilitate the integration of such variants.

In some embodiments, the HOHRC algorithm described above may be improved by observing that the net effect of several traversal steps executed in sequence (without activity by other threads) is to increment the reference count of the last node accessed and decrement that of the first. This is because the reference count of each of the intermediate nodes is incremented and subsequently decremented. By combining these steps into a single transaction, not only can the cost of starting and committing a transaction be amortized over multiple steps down the list, but also the extra steps used to modify the intermediate nodes can be avoided, thereby improving cache behavior. Note that this combining of accesses is safe because the intermediate nodes are accessed inside a transaction that ensures not only that the first node accessed in a transaction is still in the list, but also that the pointers between this node and subsequent ones are intact. This technique is referred to herein as "telescoping", and the number of nodes accessed in each transaction is referred to herein as the "step size". Note that this telescoping technique may also be applicable to other algorithms. For example, in the fast collect algorithm, each transaction could read the shared deregister counter once, and then access a number of list nodes, thereby amortizing the cost of starting and committing a transaction and of reading the deregister counter over a number of list node accesses.

In embodiments in which telescoping is employed, the choice of step size may depend on several factors. For example, larger step sizes may allow fixed transaction costs to be amortized over more steps, but may make transactions more vulnerable to abort, depending on the algorithm and limitations of the underlying HTM implementation. In some embodiments, the step size cannot be greater than the size of CPU's store buffer, since each step performs at least one store (to record a value in the result set). Because different step sizes perform best at different contention levels, some embodiments may implement a mechanism for adapting the step size based on the abort rate. In some embodiments, this mechanism may base its decisions on the success or failure of a group of recent transactions (e.g., the most recent eight transactions). However, in order to avoid excessive resizing, only transaction attempts since the last resize operation may be considered relevant to the decision. In one embodiment, a mechanism for adapting the step size used in a collect operation may maintain a counter that records the difference between the number of commits and the number of aborts amongst the relevant transactions. The counter may be maintained by using an 8-bit vector to record the results of the most recent transactions. This may allow the contribution of the oldest transaction to be "aged out" and the difference counter to be updated accordingly. For example, in one embodiment, if the value of the counter is greater than 6 after a commit, the step size may be doubled. If the value of the counter is below −2 after an abort, the step size may be cut in half. Such thresholds for modifying the step size may be determined experimentally.

As noted above, a variety of array-based algorithms may be implemented to demonstrate the exploitation of hardware transactional memory to facilitate memory management of dynamic-sized data structures. The array-based algorithms described herein may be categorized based on how and/or when they: (1) manage memory, (2) register new handles, and (3) compact (move elements inside) the array. For example, array-based memory management algorithms may be considered either static or dynamic. The static algorithms may not solve the dynamic collect problem at all. Instead, they may assume a known upper bound on the number of handles to be registered, and may not attempt to deallocate unused space. As described in more detail below, the dynamic array-based algorithms may replace the current array with a new one of a different size, employing a level of indirection to identify the current array. For example, in one embodiment the array may be doubled when it is full, i.e. when every slot (array entry) is in use for a registered handle. In this example, the array may be halved when it is 25% full (or less). By only resizing the array when it is full or vastly underutilized, excessive resizing may be avoided while keeping space usage proportional to the number of registered handles.

In some embodiments, to resize the array, these algorithms may allocate a new one, and install it as the "new" array. The values stored in the current array may then be copied to the new array, after which the new array may be made current. In some embodiments, these steps may be performed in cooperation with other threads. While there may be small differences in how different ones of the algorithms achieve this, the detailed description of the Array-Dyn-Append-Dereg algorithm may be representative of the group.

In various embodiments, a register operation may either search for an empty slot or append a new element after the last used slot in the array (e.g., using a variable reflecting the current active slot count). To reduce or avoid fragmentation, the array may in some embodiments be "compacted" by moving elements within it. Some algorithms may perform a compaction operation following each resize operation or following each deregister operation. Other algorithms may not perform any compaction. In some embodiments, compacting may require slots to be moved by threads other than their owners. This may create a race between one thread moving a given slot and another performing an update operation targeting the given slot, which may require synchronization between these threads. Algorithms that perform a compaction following resize operations may move slots only when the array is resized. In such embodiments, elements may be copied into consecutive locations in the new array. Algorithms that perform compaction with every deregister operation may use a transaction to move the last used slot into the space used by the slot being deregistered, atomically updating other data (e.g., a count of the number of registered slots, and/or data used to associate the handle of the moved slot with the memory location in which it is stored). Note that in some embodiments, collect operations may access the elements in the array from the last element towards the first element to avoid missing an element that is moved by a concurrent deregister operation. In some cases, this may lead to multiple values being returned by the same collect operation for the same handle. However, as discussed above, this may be allowed by the specification, whereas missing a handle entirely may not be allowed.

Various combinations of the design choices described above may yield meaningful memory management algorithms. For example, the following named algorithms may reflect the choices made for memory management, registering, and compacting: Array-Static-Search-NoCompaction, Array-Static-Append-CompactDereg, Array-Dynamic-Search-Resize, and Array-Dynamic-Append-Compact-Dereg.

In experiments to assess the impact of exploiting hardware transactional memory in memory management of dynamic-sized data structures, two non-HTM-based collect algorithms were developed for comparison. The static baseline algorithm used a fixed-sized array, with threads mapped statically to slots in it. In this algorithm, register and deregister are no-ops, update operations by a thread write directly to the thread's slot, and collect operations simply scan the entire array and return the set of non-null values seen. Again note that such static algorithms do not solve the dynamic collect problem, but may be considered in order to put the performance of dynamic algorithms in context.

The dynamic baseline uses a doubly linked list of nodes whose forward pointers are augmented with reference counts for the pointed-to node. In this algorithm, register searches for a free node, incrementing forward pointer counters on the way. If none is found, a new one is added to the end of the list. The address of the node that is found or added is returned as the handle. In this algorithm, update uses the handle to store the value directly into the registered node. In this algorithm, a deregister call for node n decrements forward pointer counters in all nodes preceding n. If any of the counters reaches zero, the node pointed to by the associated forward pointer may be un-linked and deallocated. In this algorithm, a collect operation traverses the list, incrementing the forward pointer counters as it goes. After reaching the end of the list, the collect operation goes back in the opposite direction, decreasing the counters, and unlinking and deallocating nodes pointed to by forward pointers that have reference counts of zero.

The Array-Dynamic-Append-CompactDereg algorithm is presented below in more detail. As described above, the name of this algorithm reflects the fact that it uses dynamic memory management, that a register operation allocates a new node after the last used node in the data structure, and that compaction is performed upon deregistration. Note that the pseudocode for the algorithm (found below) uses C++-like notation. For example, the * operator is used for declaring and dereferencing pointers, → is used to denote accessing a field of a structure through a pointer, and the & operator is used for taking the address of a variable. In the example below, "public" is used to denote all functions and types that are part of the object interface.

In this example, the Array-Dynamic-Append-CompactDereg algorithm uses a dynamic array of "slots". Each slot can store one value that has been associated with one handle. The current array and the number of slots in it are identified by variables called "array" and "capacity", respectively. To resize the array, a thread may allocate a new array (as in line 96), atomically store a pointer to the new array in "array_new" and its size (i.e. the total number of slots, all of which are unused at this point) in "capacity_new", and set a variable "copied" to zero to indicate that no slots have been copied from the old array to the new array yet (as in lines 100-102). In this example, the thread calls a method "help_copy". This method may copy slots individually from the old array to the new (as in lines 119-121), and then may make the new array current and set array_new back to NULL to facilitate subsequent resizing (as in lines 124-126). In this example, other threads calling help_copy may also participate in the resizing operation, and whichever thread makes the new array current deallocates the old array (as in line 130), e.g., returning the memory allocated to the old array to the operating system.

In this example, the value associated with a handle can be moved, either during resizing, or if it is the last value in the current array and is moved to replace a slot being deregistered. To facilitate the moving of values, each handle has an associated "slot reference" (i.e. a pointer that points to its associated slot), and the slot contains a pointer back to the location of this slot reference (and the handle may be a pointer to the slot reference). This way, when a value is moved, the slot's pointer to the slot reference can be used to update the slot reference so that it points to the new slot (as in lines 56 and 120). This may allow subsequent update operations for that handle to determine its new location. Note that in some embodiments, the encoding for a handle may be based on the address of the associated slot reference.

Note that in some embodiments, hardware transactional memory may facilitate the implementation of a minor variant on the Array-Dynamic-Append-CompactDereg algorithm described herein that is optimized for update performance at the cost of higher overhead for collect operations. In this variant, the value associated with a handle is stored together with the slot reference for that handle, rather than in the array slot to which it points. In such embodiments, all updates for a given handle modify the same memory location, even if the array location identifying the slot reference changes due to compaction of the array. Therefore, an update operation can store its value directly and without using a transaction (at least for some common cases), rather than through a level of indirection using a transaction. However, using this approach, collect operations must use a transaction to dereference the pointer in each array slot in order to access the associated value. Depending on the anticipated workload, this may be an appropriate choice.

Figure 6:
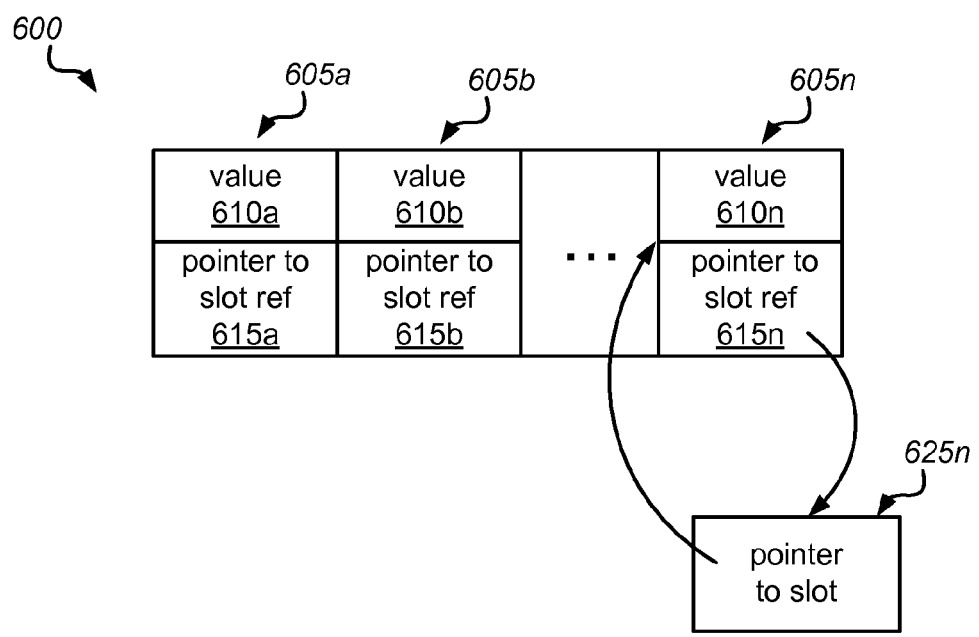
FIG. 6 is a block diagram illustrating elements of a dynamic array, according to one embodiment.

FIG. 6 illustrates a dynamic array 600, which may be representative of the current and new arrays in the detailed example of the Array-Dynamic-Append-CompactDereg algorithm described herein. In this example, the basic element of dynamic array 600 is a "slot" of type slot_t. Each slot contains a respective value 610, and a pointer 615 that points to an associated slot reference 625 (where the handle may be the address of the slot reference). In this example, each slot reference 625 contains a pointer to a respective slot 605. Therefore each pointer 615 is of type slot_t**, and each slot reference 625 is of type slot_t*. In the detailed example described below, a pointer to one such slot reference 625 is returned in response to a call to the register method, and the slot reference 625 that is pointed to by the returned pointer contains a pointer to a slot 605. In other words, the return type for the register method is slot_t**. In the illustrated example, array 600 includes slots 605a-605n. In this example, pointer 615n in slot 605n points to handle 625n, and slot reference 625n points back to slot 605n.

In the detailed example of the Array-Dynamic-Append-CompactDereg algorithm shown by the pseudocode below, the register operation is simple in the common case. For example, it allocates a new slot reference (as in line 19) and calls an "append" method. The append method stores the new value and a pointer to the new slot reference in the first unused slot, updates the slot reference to point to the new slot, and increments the "count" variable so that a subsequent register operation will use the next slot (as in lines 69-71). In this example, the deregister operation is also straightforward in the common case: it copies the last used slot to the slot being deregistered, updates the slot reference for the moved slot to point to its new location (as in line 56), decrements count to make the last used slot available again (as in line 54), and frees the slot reference associated with the deregistered handle (as in line 65).

In this example, more complicated cases for the register and deregister operations may arise due to resizing operations on the array. For example, if a new array is being installed (as in lines 23 and 53), these operations call a "help_copy" method to ensure that the new array becomes current before trying again. Furthermore, these operations perform additional steps in order to keep the space used by the array proportional to the number of registered slots, while ensuring a non-zero minimum number of slots. In the detailed example below, the following invariant is maintained:

$$\max(\text{count}, \text{MIN\_SIZE}) \leq \text{capacity} \leq (4 * \text{count}).$$

In this example, the register operation determines whether there is still room in the current array (as in line 24), and if not initiates an attempt to grow the array (as in line 39). Similarly, the deregister operation determines whether decrementing the number of slots used would violate the invariant, and if so initiates an attempt to shrink the array (as in line 61). In this example, both procedures pass the values of the count and capacity variables seen in the transaction to the "attempt_resize" procedure. The resize attempt is abandoned if either of these variables differs from the previously observed value (at line 99), as this indicates that either there is no longer any risk of violating the above invariant, or the array has already been resized. In this example, if copying is already in progress, the resize attempt is abandoned, and the thread helps to complete the current resizing, if necessary (as in lines 99 and 107). Note that in this example, the new array size chosen when resizing (whether shrinking or growing) is twice the value of the count variable. Using this approach, after a successful resize, the count value is in the middle of the range of values that satisfy the above invariant, and further resizing will occur only when (and if) the number of registered handles either halves or doubles.

Note that in this example, a register operation can complete even while re-sizing is in progress, provided there is enough space for the newly registered element in both the old and new arrays (as in line 32). This is because the same transaction that determines that the last element has been copied (at line 118) also installs the new array. Thus, if a register operation succeeds in claiming a slot in the current array during resizing, it is guaranteed that the slot will be copied to the new array before the new array becomes current.

Figure 7A:
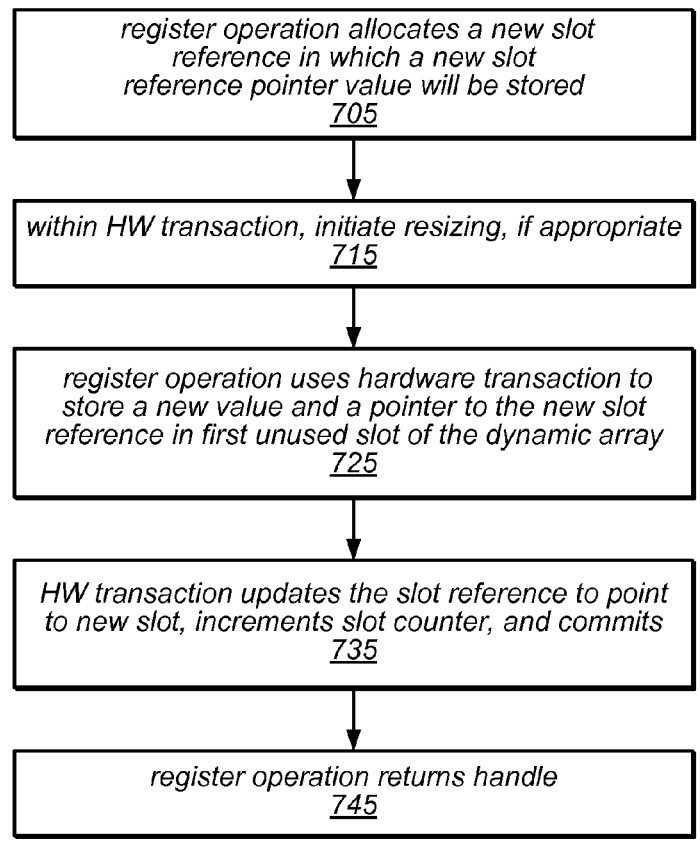
FIGS. 7A-7C are flow diagrams illustrating register, deregister, and collect operations for a dynamic array, according to one embodiment.

The register, deregister, and collect operations described above and in the example pseudocode below may be further illustrated by the flow diagrams in FIGS. 7A-7C, according to one embodiment. For example, the register operation described above may be further illustrated by the flow diagram in FIG. 7A. In this example, an operation to register a new handle corresponds to the designation of an unused element of a dynamic array (e.g., a slot 605 of array 600) for the use of an application or thread, and may also be considered (and/or referred to herein) as an operation to register the slot itself. The register operation allocates memory for a new handle in which a new slot reference value will be stored, as in 705. In some embodiments, the value of a slot counter (called "count", in this example) may reflect the number of registered slots in the dynamic array. In some such embodiments, this value may indicate the position of (or an index identifying) the next available slot in the dynamic array (e.g., the slot following the last used slot in the dynamic array). In other embodiments this value may identify the last used slot in the dynamic array (from which the next available slot can be determined). As described above, a resizing operation may be initiated from within the hardware transaction, if appropriate. This is illustrated at 715. As illustrated at 725, the register operation uses a hardware transaction to store a new value and a pointer to the new handle in the first unused slot of the dynamic array. Note that while this example illustrates an embodiment in which a resizing operation may be performed prior to writing to an unused node (e.g., if there are no unused nodes available), in other embodiments resizing may be initiated after filling in the last available slot. In another example, if the designation of an additional slot in the array for use by an application or thread causes the array to violate the size constraints described above, the dynamic array may be resized in order to conform to the constraints. However, with these variants, care must be take to avoid resizing unnecessarily.

As illustrated at 735, the register operation may include the hardware transaction updating the slot reference value to point to the new slot in the dynamic array, incrementing the slot counter to indicate the next available slot to a subsequent operation, and committing. The register operation may then return a handle (which is a pointer to the slot reference), as in 745. In other words, the register operation may return a pointer to a location in which a pointer to a new slot (one allocated for the use of the calling application or thread) is stored.

Figure 7B:
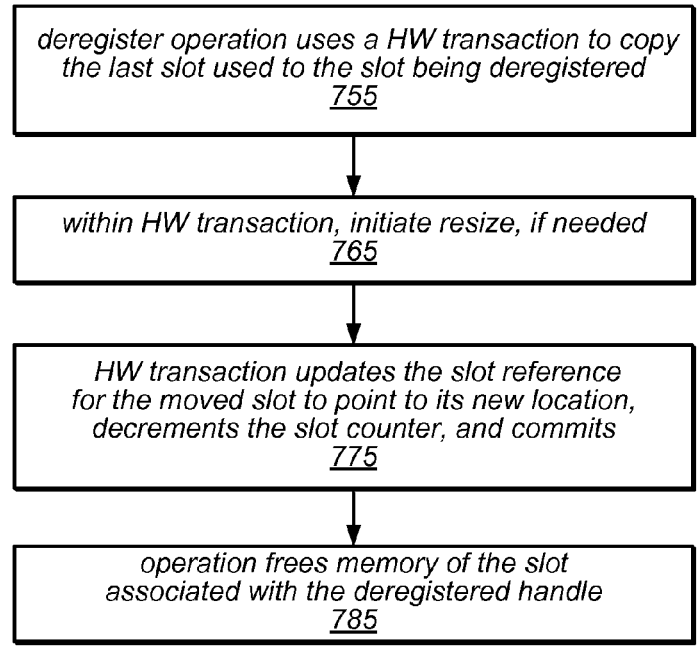

The deregister operation described above may be further illustrated by the flow diagram in FIG. 7B, according to one embodiment. In this example, an operation to deregister a handle corresponds to the removal of an element of a dynamic array (e.g., a slot 605 of array 600) from the use of an application or thread (e.g., the application or thread that registered the handle). As described above, a resizing operation may be initiated from within the hardware transaction, if appropriate. This is illustrated at 765. As illustrated at 755, the deregister operation may use a hardware transaction to copy the last slot used in the dynamic array to the slot being deregistered. In other words, both the value stored in the last used slot and the pointer to its corresponding slot reference may be copied to the slot being deregistered. In this example, the hardware transaction updates the slot reference for the moved slot to point to its new location (i.e. its location in the slot being deregistered), as in 765, and commits. As illustrated in FIG. 7B, the hardware transaction may also decrement the slot counter e.g., so that it can indicate the next available slot to a subsequent operation. Finally, the deregister operation may include freeing the memory that was allocated to the slot reference associated with the newly deregistered handle, as in 785.

Note that while this example illustrates an embodiment in which a resizing operation may be performed prior to removing an unused node, in other embodiments resizing may be initiated after removing the node. In such embodiments, if the removal of a node in the array from use by an application or thread causes the array to violate the size constraints described above, the dynamic array may be resized in order to conform to the constraints.

In some embodiments, the requirements of the collect operation may be satisfied by reading (and copying) the values from all registered slots within a single hardware transaction. However, this may not be practical, as many existing HTM implementations do not support transactions of unbounded size. Furthermore, even in systems that support large or unbounded transactions, attempting to read many locations within a single transaction may cause that transaction to conflict with any number of concurrent update operations, which could result in excessive transaction aborts. In other embodiments, such as the one illustrated by the pseudocode below, the collect operation may read and copy only one slot in each hardware transaction. In still other embodiments, the collect operation may read and copy more than one slot per transaction (e.g., a relatively small subset of the registered slots) in order to reduce the overhead associated with starting and committing each of the transactions. In other words, the operations illustrated at lines 87-90 of the pseudocode below can be executed multiple times in the same transaction, in some embodiments. Experiments using different "step sizes" (i.e. numbers of elements copied within each transaction) were performed, with the results described below.

Note that even in embodiments in which the collect operation uses multiple transactions, the collect operation itself may be relatively simple (as compared to implementations that do not exploit hardware transactions). Also note that in some embodiments, a collect operation may be able to proceed despite concurrent re-sizing and/or compacting. This is because any slot that is continually registered during the collect operation either stays at the same index in the current array, or moves to a lower one due to a concurrent deregister operation. Therefore, because the collect operation reads from the slot of the current array for each index below the value of count observed at the beginning of the collect operation in reverse order, a slot will not be missed even if it is moved to a new array during the collect operation. However, there may be an exception, in some embodiments. For example, if a resize operation was already in progress when a collect operation began, then the collect operation could copy a value from a slot that had already been copied to the new array. An update operation could have updated such a slot in the new array before the collect operation began, but the collect operation would fail to return the new value, which would be incorrect. To eliminate this possibility, the collect operation illustrated in the pseudocode below begins by calling the help_copy method, which ensures that there is no copy in progress before it returns. While the collect operation may still miss updates performed during subsequent resizes, these updates would be concurrent with the collect operation. Therefore, the specification described above allows them to be missed. Finally, note that the collect operation may check that the index from which it is about to read is still valid (as in line 85) to avoid reading deregistered slots, and may "advance" the index down to count-1, if not.

Figure 7C:
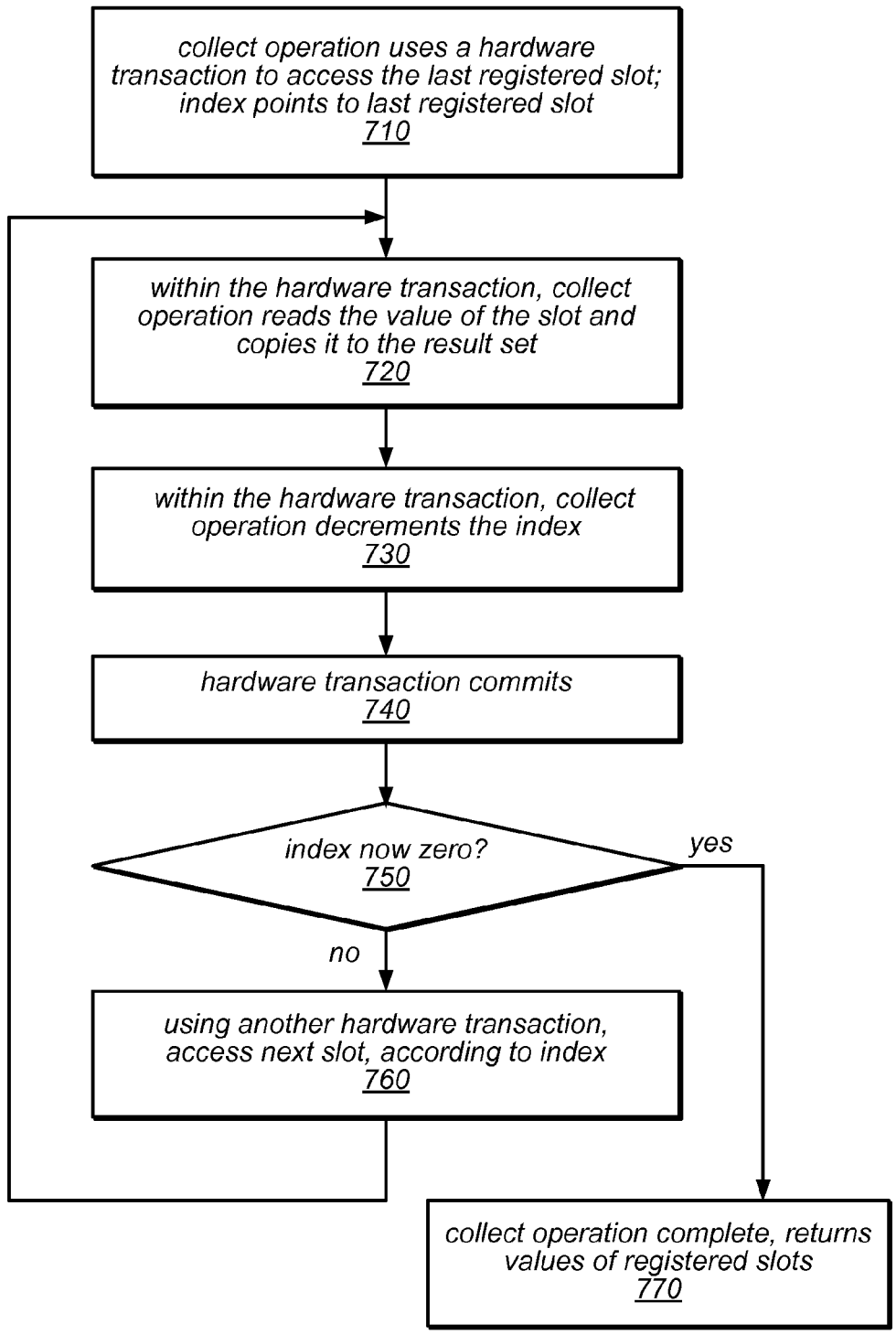

The collect operation described above, at least in the common case, may be further illustrated by the flow diagram in FIG. 7C, according to one embodiment. As noted above, in some embodiments, the collect operation may scan the dynamic array in reverse order (e.g., from the last registered slot to the first registered slot). In this example, a collect operation uses a hardware transaction to access the last registered slot of a dynamic array, as in 710. For example, the value of the slot counter (which reflects the number of registered slots in the dynamic array) may be used to determine an initial index into the dynamic array, beginning with the last registered slot (which may be indexed at a value of count-1). Within the hardware transaction, the collect operation may read the value of the slot, and copy the value to its result set, as in 720. The collect operation may then decrement the index (as in 730), and the hardware transaction may commit (as in 740). Note that if another transaction accesses the same slot while the hardware transaction of the collect operation is in progress (i.e. before it successfully commits), the hardware transaction of the collect operation may in some embodiments abort rather than commit. In some embodiments, if the hardware transaction of the collect operation fails to commit, the collect operation may be aborted and/or retried from the beginning.

If, after being decremented, the index is non-zero (shown as the negative exit from 750), there may be additional registered slots in the dynamic array. In this case, the collect operation may use additional hardware transactions to access the other registered slots in reverse order, according to the index. This is illustrated in FIG. 7C by the feedback from 760 to 720. In this case, the operations illustrated as 720-750 may be repeated for each of the additional registered slots in the dynamic array as the collect operation scans the dynamic array in reverse order. If the index is zero, shown as the positive exit from 750, there may be no additional registered slots in the dynamic array. Once all of the registered slots have been examined and their values copied, the collect operation may be complete, as in 770, and the values of the registered slots (which were copied into the result set) may be returned to the calling application or thread.

The following pseudocode illustrates the Array-Dynamic-Append-CompactDereg algorithm described in detail above, according to one embodiment.

```
1 public struct slot_t {
2         val_t val;
3         slot_t **slot_ref;
4 }
5
6 # shared data
7 slot_t array[ ] = new slot_t[MIN_SIZE];
8 int capacity =MIN_SIZE; // MIN_SIZE ≥ 1
9 int count = 0;
10 slot_t array_new[ ] = NULL; ;
11 int capacity_new;
12 int copied;
13
```

-continued

```
14 bool copying( ) {
15         return array_new != NULL; ;
16 }
17
18 public slot_t **register(val_t val) {
19 slot_t **slot_ref =new (slot_t*);
20 action_t action =NOTHING;
21 while(action != DONE) {
22         atomic {
23                 if(!copying( ) ){
24                         if(count < capacity) {
25                                 append(slot_ref, val);
26                                 action =DONE;
27                         } else {
28                                 count_l = count;
29                                 action = GROW;
30                         }
31                 } else {
32                         if(count < capacity && count < capacity_new)
                         {
33                                 append(slot_ref, val);
34                                 action =DONE;
35                         }else
36                                 action = HELP;
37                 }
38         }
39         if(action = =GROW) attempt_resize(count_l, count_l);
40         else if(action = =HELP) )help_copy( );
41 }
42 return slot_ref;
43 }
44
45 public void deregister(slot_t **slot_ref) {
46         action_t action = HELP;
47         while(action != DONE) {
48                 atomic {
49                         count_l = count;
50                         capacity_l = capacity;
51                         if (count_l * 4 = = capacity_l && count_l * 2 ≥
                         MIN_SIZE
52                                 action = SHRINK;
53                         else if(!copying( )) {
54                                 count =count_l-1;
55                                 **slot_ref = array[count];
56                                 *(array[count].slot_ref) = *slot_ref;
57                                 action = DONE;
58                         }
59                 }
60                 if(action = = SHRINK) {
61                         attempt_resize(count_l, capacity_l);
62                         action = HELP;
63                 }else if(action = = HELP) help_copy( );
64         }
65         delete slot_ref; ;
66 }
67
68 void append(slot_t **slot_ref, val_t val) {
69         array[count] = slot_t(val, slot_ref);
70         *slot_ref = &(array[count]);
71         count = count + 1;
72 }
73
74 public void update(slot_t **slot_ref, val_t val) {
75         atomic {
76                 (*slot_ref) -> val = val;
77         }
78 }
79
80 public void collect(vector_t ret) {
81         help_copy( );
82         int i = count t-1;
83         while(i >= 0) {
84                 atomic {
85                         if(i>= count)
86                                 i = count-1;
87                         if(i>= 0) {
88                                 ret.add(array[i].val);
89                                 i=i-1;
90                         }
```

-continued

```
91            }
92        }
93 }
94
95 void attempt_resize(int count_l, int capacity_l) {
96        slot_t array_tmp[ ] = new slot_t[count_l * 2];
97        bool free_tmp = true;
98        atomic {
99            if(!copying( ) &      & count = = count_l &&
                 capacity = = capacity_l) {
100                array_new = array_tmp;
101                capacity_new = count_l * 2;
102                copied = 0;
103                free_tmp = false;
104            }
105        }
106        if(free_tmp) delete[ ] array_tmp;
107        help_copy( );
108 }
109
110 void help_copy( ) {
111        while(copying( )) help_copy_one( );
112 }
113
114 void help_copy_one( ) {
115        slot_t array_to_free[ ] = NULL;
116        atomic {
117            if(copying( )) {
118                if(copied < count) {
119                    array_new[copied] = array[copied];
120                    *(array_new[copied].slot_ref) =&
                        array_new[copied];
121                    copied = copied + 1;
122                } else {
123                    array_to_free = array;
124                    array = array_new;
125                    capacity = capacity_new;
126                    array_new = NULL;
127                }
128            }
129        }
130        if(array_to_free !=NULL) delete[ ] array_to_free;
131 }
```

Note that the exploitation of hardware transactional memory in managing memory for the dynamic array described above may facilitate adherence to simple invariants. For example, in the pseudocode above, the variable "capacity" always contains the size of the current array (referenced by the "array" variable), and "capacity_new" contains the size of the new array (referenced by "array_new"). In this example, access-after-free errors may be easily avoided since only arrays that are not referenced by either "array" or "array_new" are deallocated, and accesses to slots in all arrays are always performed inside transactions that confirm that the array is identified by one of these variables. Similarly, ensuring that a handle's slot reference always points to its slot facilitates moving slot data without the risk of an update operation accessing the old location. Without hardware transactions, these simple relationships are difficult, if not impossible to maintain. This is because the variables involved in these relationships must be updated individually, which significantly complicates the algorithm. Note that the optimization of allowing a register operation to complete despite ongoing resizing is included in the detailed example described herein in order to illustrate the power of hardware transactional memory to facilitate such changes. By contrast, non-blocking algorithms designed using only traditional hardware support for synchronization are delicate and inflexible, making such optimizations infeasible or too complicated.

In the example Array-Dynamic-Append-CompactDereg algorithm described above, the "array" and "array_new" variables may be used as indicators to ensure that some of the memory accesses are safe. For example, the memory accesses in line 119 are both confirmed to be safe using these indicators. However, there are other cases that are less straightforward. In particular, the slot references may also act as indicators that some memory accesses are safe. For example, the algorithm may maintain an invariant that each slot reference associated with a handle that has been registered is not deallocated before the handle is deregistered, and furthermore that it points to a slot in the array pointed to by either "array" or "array_new". Thus, in this example, the slot reference can be used as an indicator that it is safe to access an array slot indicated by the slot reference.

Similarly, the algorithm may maintain an invariant that the slot_ref field of each entry in the appropriate range of each array points to a slot reference that has not been deallocated. Thus, in line 120, for example, the "array_new" variable, together with the "copied" variable that demarcates the appropriate range of the array pointed to by "array_new", may be used as an indicator to ensure the safety of accessing the array entry, and these variables together with the "slot_ref" field of the array entry may serve as an indicator to ensure the safety of accessing the slot reference identified by the "slot_ref" field of the array entry.

Note that the instructions that access dynamically allocated memory in the example Array-Dynamic-Append-CompactDereg algorithm described above are in lines 19 (slot reference constructor), 55, 56, 69, 70, 76, 88, 119, and 120. In this example, all other memory accesses are to statically allocated variables (e.g., "count", "array", "capacity", etc.). Line 19 accesses memory that has just been allocated and has not yet been "published". Therefore, since no other thread has a reference to it, it cannot have been freed by the time of the memory access, and is safe to access at this point.

For the remaining accesses to be performed safely, they may need to assume some invariants that further depend on an assumption that clients obey the well-formedness conditions, described herein (such as only performing a store operation via a handle that the thread has registered and not subsequently deregistered). A first invariant may be that if a thread has received handle h from a Register operation and has not subsequently DeRegistered that handle, then the slot reference that h points to has not been deallocated since it was last allocated, and furthermore it points to a valid slot of an array that is pointed to be either "array" or "array_new". Note that a valid slot of an array pointed to by "array" is a slot with index in [0, count), and a valid slot of an array pointed to by "array_new" is one with index in [0, copied). A second invariant may be that the slot_ref field of each valid slot in an array pointed to by "array" or by "array_new" points to a slot reference that has not been deallocated since it was last allocated. A third invariant may be that an array pointed to by "array" or "array_new" has not been deallocated since it was last allocated. In the example above, line 55 accesses (reads from) a valid slot of the array pointed to by "array", and writes to a location whose address is stored in the slot reference associated with the handle passed to the DeRegister operation. Because the transaction within which the read is performed reads "array" and "count", the third invariant described above implies that the read is safe. In this example, the write is safe because, according to the first invariant described above, the contents of the slot reference referred to by "slot_ref" points to a valid slot in an array pointed to by either "array" or "array_new". Therefore, according to the third invariant, it is safe to store to this location. Similar arguments using these invariants may be used to show that all memory accesses in the example Array-Dynamic-Append-CompactDereg algorithm described above are safe.

In experiments performed on a system that includes a 16-core Rock CPU, several micro-benchmarks were used to evaluate different aspects of the dynamic collect algorithms described herein. For example, the latency of update operations was measured at about 215 ns for the Array-Static-Append-CompactDereg, Array-Dynamic-Search-CompactResize, and Array-Dynamic-Append-CompactDereg algorithms, and about 135 ns for the remaining algorithms. This may be explained by the fact that the remaining algorithms all perform update operations directly to an address determined by the handle, whereas the algorithms named above all require a level of indirection through the handle to determine the address to write. Although this may seem like a significant difference, in many workloads of interest, update operations will account for a small fraction of application runtime. Furthermore, the ability of some of the algorithms to perform update operations using naked store instructions depends on the values being stored fitting within a single machine word, as in these experiments. For larger values, synchronization (whether HTM-based or not) would be needed to prevent collect operations from returning partial values, which would largely close the gap in update performance. In addition, it may be straightforward to reduce the frequency of deregister and register operations in workloads in which they are invoked frequently enough to dominate performance. Therefore, the evaluation largely concentrated on the performance of the collect operation.

In one benchmark, threads randomly performed operations, with the following distribution: collect 90%, update 8%, register 1%, deregister 1%. In experiments based on this benchmark, each thread t maintained a queue of at most $n_t$ slots, where the number of slots maintained in the queues were chosen to distribute a total of 64 slots evenly amongst the threads used. Before measurement began, the threads registered a total of 32 of the 64 slots, which are distibuted evenly between them. In these experiments, a thread ignored register operations when its queue was full and ignored deregister and update operations when the queue was empty. Otherwise, for a register operation, a thread registered a new slot and added it to its queue; for a deregister operation, the thread removed a slot from its queue and deregistered it; and for an update operation, the thread stored to the least recently used slot in the thread's queue.

In these experiments, the dynamic baseline and HOHRC algorithm performed significantly worse than all other algorithms. This may be due to poor cache performance caused by modifying each node in the list while traversing it. These two algorithms were similarly outperformed by large margins in all experiments involving collect operations. In these experiments, the Array-Dynamic-Append-CompactDereg and Array-Static-Append-CompactDereg performed best for up to 8 threads. In fact, they outperformed even the static baseline. This may be because the collect operation of the static baseline traverses the entire array (which is on average only half full), whereas the append algorithms scan only registered slots. With higher thread counts, the collect transactions restarted more often (due to higher contention), and the Append-CompactDereg algorithms became slower than Array-Static-Search-NoCompact with 16 threads (recall that this algorithm does not solve the dynamic collect problem). Even so, both algorithms were consistently among the best performers. The two Append-CopmactDereg algorithms demonstrated roughly the same performance up to four threads, but diverged slightly thereafter. However, this difference may have been caused by idiosyncrasies of the Rock CPU, rather than algorithmic differences.

Another benchmark evaluated collect performance under contention from concurrent updates. In experiments based on this benchmark, one thread performed collect operations while 15 other threads executed updates. In these experiments, update threads performed update operations no more often than the update period, which was varied in order to control contention. Before measurement began, the update threads registered a total of 64 handles. In these experiments, each update thread used the same one of its handles for all operations and the rest of the handles were unused. However, the other handles were registered in order to keep the total number of registered slots in this experiment independent of the number of threads.

In these experiments, the performance of static baseline and Array-Static-Search-NoCompact (whose collect operations do not use transactions) were affected only slightly by more frequent update operations, due to an increase in cache misses. For the other algorithms, the performance degraded more significantly in the face of more frequent update operations because the collect transactions aborted more often (due to higher contention). The two Append-CompactDereg variants performed best for all update periods except 400 cycles. Even at this point, the Append-CompactDereg algorithms performed only slightly worse than the static baseline and Array-Static-Search-NoCompact (which do not solve the dynamic collect problem), and easily outperformed all algorithms that do solve the dynamic collect problem. Thus, the Append-CompactDereg algorithms were clearly superior for this benchmark.

In some embodiments, the algorithms may support an adaptive step size for the collect operation (e.g., changing the number of copy operations per hardware transaction). One experiment examined the need for and effectiveness of such an adaptive step size using the Array-Dynamic-Append-CompactDereg algorithm. In this experiment, the tradeoff discussed above was apparent: larger step sizes resulted in lower overhead for successful transactions, but larger transactions were more likely to abort as contention increased. In this experiment, collect operations that used a step size of 32 did not complete for update periods less than 2000 cycles. In an adaptive algorithm, the collect operation may collect additional data to enable the selection of an appropriate step size.

Another benchmark was used to evaluate the performance of collect operations under contention from concurrent register and deregister operations. In experiments based on this benchmark, one thread executed collect operations, while 15 other threads executed register-deregister pairs with delays between them. In these experiments, the delay between the start of a deregister and the start of the following register operation (which may be referred to as the register period) was fixed to 20,000 cycles, and the delay between the start of the register and the start of the following deregister operation (which may be referred to as the deregister period) was varied. Initially, the total number of registered slots was 64, evenly distributed across the register/deregister threads. In these experiments, the threads began by first deregistering a slot, so that the total number of registered slots was always at most 64.

In experiments with long deregister periods, algorithms in which collect operations traversed only the registered slots performed best. The others performed worse because they either traversed all slots (e.g., the static baseline), or because they frequently traversed more slots than are registered due to infrequent compaction (e.g., Array-Dynamic-Search-CompactResize) or no compaction (e.g., Array-Static-Search-No- Compact). In these experiments, as the deregister period decreased, the algorithms that performed best with large deregister periods began to degrade due to increased abort rates (e.g., because of more frequent register and deregister operations). For example, the performance of Array-Static-Append-CompactDereg and Array-Dynamic-Append-CompactDereg degraded significantly due to higher abort rates. The fast collect algorithm also degraded significantly (due to increased deregister frequency resulting in increased contention on the deregister count), causing the collect operations to start over from the beginning. Note that several of the algorithms exhibited noticeable performance gains at the shortest deregister periods. This may be because a shorter deregister period resulted in fewer handles being registered at a time. Therefore, the collect operations were both shorter and less likely to conflict with a concurrent deregister operation. For applications that perform frequent register and deregister operations, performance of many of the algorithms may be improved by deferring the deregistering of handles, allowing them to be reused by subsequent register operations. For these workloads, such a modification may make collect operation conflicts on the deregister count be less frequent and thus cause fewer aborts.

In a final benchmark, the performance of collect operations was evaluated as the number of registered slots varied. In experiments based on this benchmark, one thread performed collect operations, while 15 other threads performed update operations with an update period of 20,000 cycles. Initially, the number of registered slots was 16. These experiments proceeded in phases, with the update threads alternately increasing and decreasing the number of registered handles every 500 ms. In these experiments, the performance of collect operations for the static baseline was not significantly affected by the number of registered slots. However, the throughput varied slightly because the collect operation copied less data when there were fewer registered slots. The Array-Static-Search-NoCompact algorithm initially performed significantly better than the static baseline. However, when the number of registered slots increased (at 500 ms, for example), its performance degraded significantly and became similar to that of the static baseline. Furthermore, the performance of Array-Static-Search-NoCompact did not improve when the number of registered slots subsequently decreased (at 1 s) because the collect operation traversed the maximum historical number of registered slots. The performance of Append-CompactDereg algorithms and fast collect were also reduced at 500 ms because the number of registered slots increased. However, when the number of registered slots decreased again at 1 s, the performance of both algorithms returned to its initial level. This experiment clearly illustrated the benefit of algorithms that adapt to the number of registered slots. In these experiments, the best performing algorithms were, again, the two Append-CompactDereg variants.

Note that the processor on which the experiments described above were performed (i.e. the Rock CPU) implements a memory consistency model in which transactions are treated as both loads and stores. This model was sufficient to support the algorithms described above without additional memory barriers. Depending on the memory consistency model implemented by other architectures that support hardware transactional memory (e.g., future CPU architectures), additional memory barriers may be required to implement these or similar dynamic collect algorithms.

Some of the algorithms described above depend on the ability to eventually commit at least some small transactions, which some HTM implementations do not guarantee. However, in some embodiments these algorithms may be modified so that they do not need this guarantee, at the cost of making the algorithms block occasionally. For example, all transactions could be made to read a lock variable and confirm that it is not held before proceeding. This way, if a transaction fails repeatedly, its effects could be applied non-transactionally while holding the lock. Note that, in the absence of any guarantees for completion of transactions, the lock itself would have to be acquired using non-transactional synchronization, e.g., using compare-and-swap (CAS). Some of the algorithms described above perform concurrent transactional and non-transactional accesses to the same variable. That is, they rely on strong atomicity. This dependence could be avoided, in some embodiments (at the cost of some additional overhead and code complexity) by replacing such non-transactional accesses with short transactions. In general, an HTM implementation may need to provide either strong atomicity or guarantees that certain "small" transactions will eventually commit (at least in the absence of contention) in order to support these algorithms. The best algorithms may be those that exploit HTM implementations that provide both features.

Some of the algorithms described herein, including the one presented in detail in the pseudocode above, have been complicated somewhat by efforts to avoid memory allocation within transactions. For example, because these algorithms have been implemented using standard malloc implementations that use CAS type instructions, and because these are not supported within transactions on the Rock CPU, modifications that might more naturally belong in one transaction had to be split into multiple transactions, complicating control flow as well as synchronization. Note, however, that this complication is due to a combination of idiosyncrasies of the particular implementation of HTM on the Rock CPU and the fact that a transactional-memory-aware allocator was not used, not due to any fundamental limitations of HTM in general. In other embodiments, the use of an HTM implementation that allows the use of CAS type instructions within transactions may simplify the implementations of these and other memory management algorithms for dynamic-sized data structures.

Figure 8:
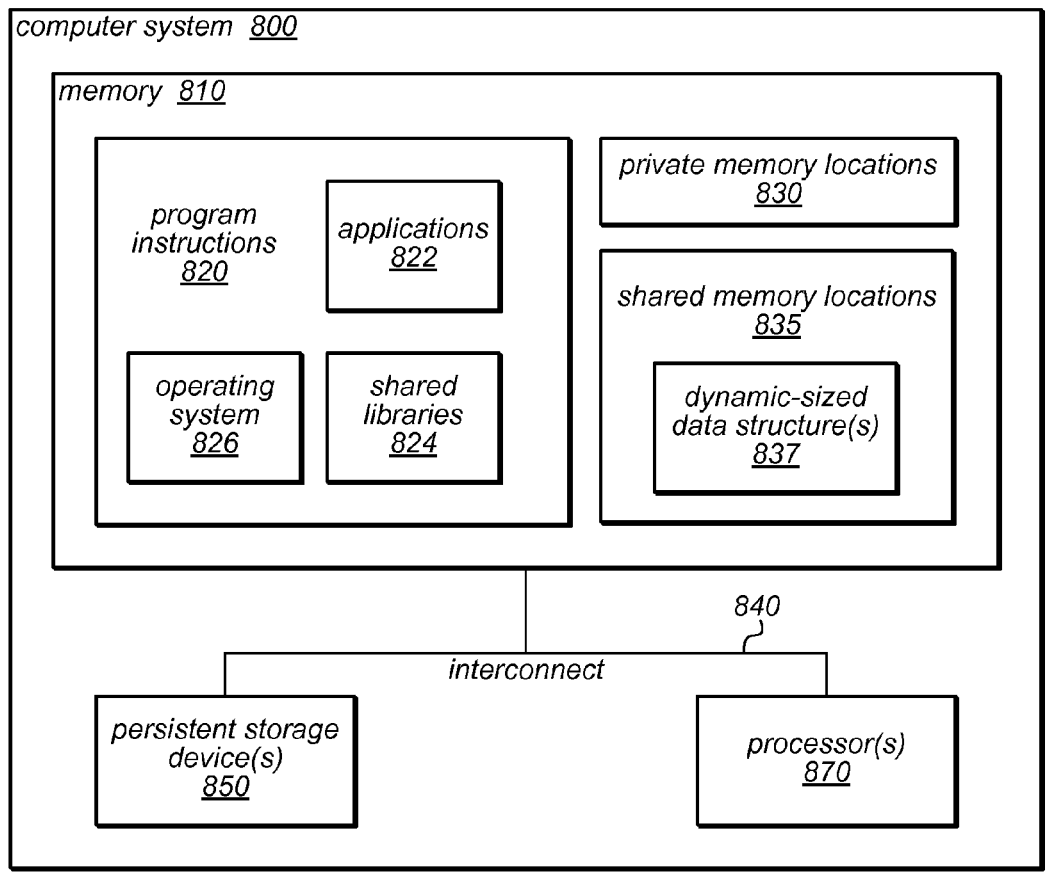
FIG. 8 illustrates a computing system configured to implement shared dynamic-sized data structures in a manner that exploits hardware transactional memory, according to various embodiments.

FIG. 8 illustrates a computing system configured to implement the methods described herein, according to various embodiments. The computer system 800 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for implementing shared dynamic-sized data structures in a manner that exploits hardware transactional memory to simplify and/or otherwise improve memory management, as described herein, may be provided as a computer program product, or software, that may include a non-transitory, computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 800 may include one or more processors 870; each may include multiple cores, any of which may be single or multi-threaded. The computer system 800 may also include one or more persistent storage devices 850 (e.g. optical storage, magnetic storage, hard drive, tape drive, solid state memory, etc) and one or more system memories 810 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 8 (e.g., video cards, audio cards, additional network interfaces, peripheral devices, a network interface such as an ATM interface, an Ethernet interface, a Frame Relay interface, etc.)

The one or more processors 870, the storage device(s) 850, and the system memory 810 may be coupled to the system interconnect 840. One or more of the system memories 810 may contain program instructions 820. Program instructions 820 may be executable to implement one or more applications 822 (which may include one or more accesses to a shared dynamic-sized data structure), shared libraries 824, or operating systems 826. In some embodiments, program instructions 820 may be executable to implement a contention manager (not shown). Program instructions 820 may be encoded in platform native binary, any interpreted language such as Java™ byte-code, or in any other language such as C/C++, Java™, etc or in any combination thereof. The program instructions 820 may include transactional memory support configured to provide functions, operations and/or other processes for implementing shared dynamic-sized data structures that may exploit a hardware transactional memory implemented in the system, as described herein. Such support and functions may exist in one or more of the shared libraries 824, operating systems 826, or applications 822, in various embodiments. The system memory 810 may further comprise private memory locations 830 and/or shared memory locations 835 where data may be stored. For example, shared memory locations 835 may store data in one or more dynamic-sized data structures 837 (and/or associated reference counters, handles, or other indicators of use or intent to use) that are accessible to concurrently executing threads, processes, or transactions, in various embodiments.

Although the embodiments above have been described in considerable detail, numerous variations and modifications will become apparent to those skilled in the art once the above disclosure is fully appreciated. For example, although many of the embodiments are described in terms of various dynamic linked lists, dynamic-sized arrays, and/or garbage collection mechanisms, it should be noted that the techniques and mechanisms disclosed herein for implementing shared data structures in a manner that exploits hardware transactional memory to simplify and/or otherwise improve memory management in a computer system may be applicable in other contexts in which shared data structures are used. It is intended that the following claims be interpreted to embrace all such variations and modifications.

What is claimed:

1. A method, comprising:
    performing, by a computer:
        beginning execution of an application that comprises instructions causing one or more accesses to a shared dynamic-sized data structure, wherein the data structure is accessible by a plurality of threads of the application or by a plurality of applications;
        designating, by the application, that an element of the data structure is available to be accessed, wherein said designating comprises updating an indicator associated with the data structure to reflect that the element of the data structure is available to be accessed by the application; and
        using a hardware transaction to access the data structure element while confirming that the data structure element is still an element of the data structure.

2. The method of claim 1, wherein said confirming comprises determining that the memory allocated to the data structure element has not yet been freed.

3. The method of claim 1, wherein the value of the indicator is usable to determine whether the data structure element is still an element of the data structure, and wherein said confirming comprises examining the indicator associated with the data structure element.

4. The method of claim 1, wherein the indicator is a reference counter associated with the data structure element, an indicator field within the data structure element, a pointer to the data structure element, or a pointer within the data structure element.

5. The method of claim 1, further comprising:
    subsequent to updating the indicator to reflect that the data structure element is available to be accessed by the application, the application updating the indicator to reflect that the data structure element will no longer be accessed by or available to be accessed by the application; and
    freeing memory allocated to the data structure element.

6. The method of claim 1, wherein the data structure comprises a last-in-first-out stack, a first-in-first-out queue, a linked list, or a dynamic-sized array.

7. The method of claim 1, wherein said designating further comprises the application initializing the value of the data structure, and wherein said initializing comprises writing an initial value to the data structure non-transactionally.

8. The method of claim 1, further comprising:
    using another hardware transaction to attempt to write a value to the data structure element; and
    in response to determining that the data structure element is not still an element of the data structure, the other hardware transaction completing without writing the value to the data structure element.

9. A system, comprising:
    one or more processors; and
    a memory coupled to the one or more processors and comprising a shared memory space;
    wherein the memory stores program instructions that when executed on the one or more processors implement one or more applications, each of which comprises instructions causing one or more accesses to a dynamic-sized data structure, and wherein the data structure is accessible by two or more processes comprising a plurality of threads of one of the one or more applications or a plurality of applications of the one or more applications;
    wherein one of the one or more applications is configured to:
        designate that an element of the data structure is available to be accessed; and
    wherein another one of the two or more processes, other than a process that designated that the element of the data structure is available to be accessed by the one or more applications, is configured to:
        use a hardware transaction to access the data structure element, wherein to use the hardware transaction to access the data structure element, the other one of the two or more processes is configured to confirm, during the hardware transaction, that the data structure element is still an element of the data structure.

10. The system of claim 9, wherein to confirm, during the hardware transaction, that the data structure element is still an element of the data structure, the one or more applications are further configured to determine that the memory allocated to the data structure element has not yet been freed.

11. The system of claim 9,
wherein to designate that the element of the data structure is available, the one or more applications are further configured to update an indicator associated with the data structure to reflect that the element of the data structure is available to be accessed by the application, wherein the value of the indicator is usable to determine whether the data structure element is still an element of the data structure; and
wherein to confirm, during the hardware transaction, that the data structure element is still an element of the data structure, the hardware transaction is configured to examine the indicator associated with the data structure element.

12. The system of claim 11, wherein the one more applications are further configured to:
subsequent to the update of the indicator to reflect that the data structure element is available to be accessed by the application, update the indicator to reflect that the data structure element will no longer be accessed by or available to be accessed by the application; and
free memory allocated to the data structure element.

13. The system of claim 9, wherein to designate that the element of the data structure is available, the one or more applications are further configured to initialize the value of the data structure, and wherein said initialize comprises write an initial value to the data structure non-transactionally.

14. The system of claim 9, wherein the program instructions are further executed on the one or more processors to:
use another hardware transaction to attempt to write a value to the data structure element; and
in response to a determination that the data structure element is not still an element of the data structure, complete the other hardware transaction without writing the value to the data structure element.

15. A non-transitory, computer readable storage medium storing program instructions that when executed on one or more computers cause the one or more computers to perform:
beginning execution of an application that comprises instructions causing one or more accesses to a dynamic-sized data structure, wherein the data structure is accessible by a plurality of threads of the application or by a plurality of applications;
designating, by the application, that an element of the data structure is available to be accessed by the application, wherein said designating comprises updating an indicator associated with the data structure to reflect that the element of the data structure is available to be accessed by the application; and
subsequent to said designating, using, by one of the plurality of threads or the plurality of applications, a hardware transaction to access the data structure element while confirming that the data structure element is still or is still expected to be in use, wherein said confirming is performed using the indicator and as part of the hardware transaction.

16. The storage medium of claim 15, wherein said confirming comprises determining that the memory allocated to the data structure element has not yet been freed.

17. The storage medium of claim 15,
wherein the value of the indicator is usable to determine whether the data structure element is still an element of the data structure; and
wherein said confirming comprises examining the indicator associated with the data structure element.

18. The storage medium of claim 17, wherein when executed on the one or more computers, the program instructions further cause the one or more computers to perform:
subsequent to updating the indicator to reflect that the data structure element is available to be accessed by the application, the application updating the indicator to reflect that the data structure element will no longer be accessed by or available to be accessed by the application; and
freeing memory allocated to the data structure element.

19. The storage medium of claim 15, wherein when executed on the one or more computers, the program instructions further cause the one or more computers to perform:
using another hardware transaction to attempt to write a value to the data structure element; and
in response to determining that the data structure element is not still an element of the data structure, the other hardware transaction completing without writing the value to the data structure element.

* * * * *

UNITED STATES PATENT AND TRADEMARK OFFICE
CERTIFICATE OF CORRECTION

PATENT NO. : 9,043,363 B2
APPLICATION NO. : 13/167606
DATED : May 26, 2015
INVENTOR(S) : Dragojevic et al.

Page 1 of 1

It is certified that error appears in the above-identified patent and that said Letters Patent is hereby corrected as shown below:

In the claims,

In column 27, line 38, delete "distibuted" and insert -- distributed --, therefor.

In column 27, line 65, delete "CopmactDereg" and insert -- CompactDereg --, therefor.

Signed and Sealed this
Ninth Day of February, 2016

Michelle K. Lee
*Director of the United States Patent and Trademark Office*